US012351750B2

(12) United States Patent
Kang et al.

(10) Patent No.: US 12,351,750 B2
(45) Date of Patent: Jul. 8, 2025

(54) QUANTUM DOT, CURABLE COMPOSITION COMPRISING THE SAME, CURED LAYER USING THE COMPOSITION, AND COLOR FILTER INCLUDING THE CURED LAYER

(71) Applicant: Samsung SDI Co., Ltd., Yongin-si (KR)

(72) Inventors: Yonghee Kang, Suwon-si (KR); Jonggi Kim, Suwon-si (KR); Jihyeon Yim, Suwon-si (KR); Dongjun Kim, Suwon-si (KR); Misun Kim, Suwon-si (KR); Minjee Park, Suwon-si (KR); Bumjin Lee, Suwon-si (KR); Injae Lee, Suwon-si (KR); Mi Jeong Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 764 days.

(21) Appl. No.: 17/595,497

(22) PCT Filed: Sep. 18, 2020

(86) PCT No.: PCT/KR2020/012595
§ 371 (c)(1),
(2) Date: Nov. 17, 2021

(87) PCT Pub. No.: WO2021/075740
PCT Pub. Date: Apr. 22, 2021

(65) Prior Publication Data
US 2022/0213380 A1    Jul. 7, 2022

(30) Foreign Application Priority Data
Oct. 14, 2019  (KR) .................. 10-2019-0127122

(51) Int. Cl.
| | | |
|---|---|---|
| *C09K 11/00* | (2006.01) |
| *C08F 122/10* | (2006.01) |
| *C08K 3/22* | (2006.01) |
| *C08K 9/04* | (2006.01) |
| *C09K 11/02* | (2006.01) |
| *G02B 1/04* | (2006.01) |
| *B82Y 20/00* | (2011.01) |
| *B82Y 40/00* | (2011.01) |

(52) U.S. Cl.
CPC ...... *C09K 11/025* (2013.01); *C08F 122/1006* (2020.02); *C08K 3/22* (2013.01); *C08K 9/04* (2013.01); *G02B 1/04* (2013.01); *B82Y 20/00* (2013.01); *B82Y 40/00* (2013.01); *C08K 2003/2241* (2013.01); *C08K 2201/011* (2013.01)

(58) Field of Classification Search
CPC .............. C09K 11/025; C08K 3/22; C08K 2003/2241; C08F 122/1006; B82Y 40/00; G02B 10/04
See application file for complete search history.

(56) References Cited

U.S. PATENT DOCUMENTS

| | | | | |
|---|---|---|---|---|
| 7,041,371 | B2* | 5/2006 | Ogura | C30B 7/00 |
| | | | | 428/407 |
| 7,361,516 | B2* | 4/2008 | Uyeda | B82Y 5/00 |
| | | | | 530/404 |
| 7,648,843 | B2* | 1/2010 | Uyeda | G01N 33/532 |
| | | | | 436/523 |
| 7,794,917 | B2 | 9/2010 | Mori et al. | |
| 8,741,177 | B2* | 6/2014 | Pickett | C09K 11/025 |
| | | | | 977/774 |
| 8,889,429 | B2* | 11/2014 | Cao | C01B 19/007 |
| | | | | 436/525 |
| 9,263,639 | B2* | 2/2016 | Aoki | H01L 33/305 |
| 9,446,152 | B2* | 9/2016 | Mattoussi | C09D 171/02 |
| 10,988,685 | B2 | 4/2021 | Ahn et al. | |
| 11,912,911 | B2* | 2/2024 | Kang | C08K 3/22 |
| 2001/0023078 | A1 | 9/2001 | Bawendi et al. | |
| 2004/0007169 | A1 | 1/2004 | Ohtsu et al. | |
| 2009/0212258 | A1 | 8/2009 | McCairn et al. | |
| 2012/0041142 | A1 | 2/2012 | Nennemann et al. | |
| 2013/0345458 | A1 | 12/2013 | Freeman et al. | |
| 2014/0192396 | A1 | 7/2014 | Schram et al. | |
| 2014/0264196 | A1 | 9/2014 | Werner et al. | |
| 2014/0275431 | A1 | 9/2014 | Freeman et al. | |
| 2015/0267106 | A1 | 9/2015 | Pillay Narrainen et al. | |
| 2016/0011506 | A1 | 1/2016 | Gu et al. | |
| 2016/0289552 | A1 | 10/2016 | Werner et al. | |
| 2018/0102449 | A1 | 4/2018 | Pschenitzka et al. | |
| 2018/0142149 | A1 | 5/2018 | Youn et al. | |
| 2018/0149974 | A1 | 5/2018 | Kim et al. | |
| 2018/0179441 | A1 | 6/2018 | Park et al. | |
| 2018/0354222 | A1 | 12/2018 | Calabrese et al. | |

(Continued)

FOREIGN PATENT DOCUMENTS

| | | |
|---|---|---|
| CN | 101391756 A | 3/2009 |
| CN | 102086396 A | 6/2011 |

(Continued)

OTHER PUBLICATIONS

US Final Office Action dated Nov. 29, 2023, issued in U.S. Appl. No. 16/742,855 (17 pages).
Chinese Notice of Allowance dated Jan. 5, 2024, issued in Chinese Patent Application No. 202010022282.0 (4 pages).
Beland, V. A. et al., "Antimony-functionalized phosphine-based photopolymer networks," Angewandte Chemie International Edition, vol. 57, Issue 40, 2018, 7 pages.
Beland, V.A. et al., "Antimony-functionalized phosphine-based photopolymer networks", Angew. Chem., 2018, vol. 130, pp. 13436-13440.
Breus, Vladimir V., et al., "Quenching of CdSe—ZnS Core-Shell Quantum Dot Luminescence by Water-Soluble Thiolated Ligands," J. Phys. Chem. C, 2007, pp. 18589-18594.

(Continued)

*Primary Examiner* — Jane L Stanley
(74) *Attorney, Agent, or Firm* — Womble Bond Dickinson (US) LLP

(57) ABSTRACT

Disclosed are a surface-modified quantum dot, a curable composition including the quantum dot, a cured layer, and a color filter.

15 Claims, No Drawings

(56) References Cited

U.S. PATENT DOCUMENTS

| | | |
|---|---|---|
| 2018/0354244 A1 | 12/2018 | Jen-La Plante et al. |
| 2018/0355244 A1 | 12/2018 | Lüchinger et al. |
| 2019/0011782 A1 | 1/2019 | Pickett et al. |
| 2019/0077954 A1 | 3/2019 | Tangirala et al. |
| 2019/0129302 A1 | 5/2019 | Youn et al. |
| 2019/0278177 A1 | 9/2019 | Jeong et al. |
| 2020/0248068 A1 | 8/2020 | Choi et al. |
| 2020/0264461 A1 | 8/2020 | Kuwana et al. |
| 2022/0213380 A1 | 7/2022 | Kang et al. |

FOREIGN PATENT DOCUMENTS

| | | |
|---|---|---|
| CN | 102277158 A | 12/2011 |
| CN | 102517025 A | 6/2012 |
| CN | 103896776 A | 7/2014 |
| CN | 105070849 A | 11/2015 |
| CN | 105131712 A | 12/2015 |
| CN | 105189584 A | 12/2015 |
| CN | 105247010 A | 1/2016 |
| CN | 106206972 A | 12/2016 |
| CN | 106468856 A | 3/2017 |
| CN | 106863935 A | 6/2017 |
| CN | 106957645 A | 7/2017 |
| CN | 107722184 A | 2/2018 |
| CN | 108102640 A | 6/2018 |
| CN | 108107679 A | 6/2018 |
| CN | 108219771 A | 6/2018 |
| CN | 108445713 A | 8/2018 |
| CN | 108445715 A | 8/2018 |
| CN | 109476989 A | 3/2019 |
| CN | 109749733 A | 5/2019 |
| CN | 109952359 A | 6/2019 |
| CN | 109994619 A | 7/2019 |
| CN | 110205111 A | 9/2019 |
| CN | 110297391 A | 10/2019 |
| EP | 2105793 B1 | 5/2016 |
| JP | 05-072723 A | 3/1993 |
| JP | 2002-121549 A | 4/2002 |
| JP | 2003-137912 A | 5/2003 |
| JP | 2009-132771 A | 6/2009 |
| JP | 2010-118434 A | 5/2010 |
| JP | 2011-122033 A | 6/2011 |
| JP | 2016-98375 A | 5/2016 |
| JP | 2016-519175 A | 6/2016 |
| JP | 2017-32918 A | 2/2017 |
| JP | 6093179 B2 | 3/2017 |
| JP | 2017-106006 A | 6/2017 |
| JP | 2017-137451 A | 8/2017 |
| JP | 6236412 B2 | 11/2017 |
| JP | 2018-84823 A | 5/2018 |
| JP | 2018-91924 A | 6/2018 |
| JP | 2018-131613 A | 8/2018 |
| JP | 2018-153915 A | 10/2018 |
| JP | 2019-85568 A | 6/2019 |
| JP | 2020-41080 A | 3/2020 |
| JP | 2020-105491 A | 7/2020 |
| JP | 2020-118971 A | 8/2020 |
| JP | 2021-501230 A | 1/2021 |
| KR | 1992-7002502 A | 9/1992 |
| KR | 1994-0005617 B1 | 6/1994 |
| KR | 1995-7000359 A | 1/1995 |
| KR | 1995-0011163 B1 | 9/1995 |
| KR | 10-2009-0078099 A | 7/2009 |
| KR | 10-2010-0138925 A | 12/2010 |
| KR | 10-2014-0072682 A | 6/2014 |
| KR | 10-2015-0023849 A | 3/2015 |
| KR | 10-2015-0052759 A | 5/2015 |
| KR | 10-2015-0098691 A | 8/2015 |
| KR | 10-2016-0022158 A | 2/2016 |
| KR | 10-2016-0097445 A | 8/2016 |
| KR | 10-2016-0114292 A | 10/2016 |
| KR | 10-2016-0119149 A | 10/2016 |
| KR | 10-2016-0135763 A | 11/2016 |
| KR | 10-2016-0142100 A | 12/2016 |
| KR | 10-2017-0006024 A | 1/2017 |
| KR | 10-2017-0022951 A | 3/2017 |
| KR | 10-2017-0028306 A | 3/2017 |
| KR | 10-2017-0035688 A | 3/2017 |
| KR | 10-2017-0047125 A | 5/2017 |
| KR | 10-2017-0060400 A | 6/2017 |
| KR | 10-2017-0073249 A | 6/2017 |
| KR | 10-2017-0075478 A | 7/2017 |
| KR | 10-2017-0101002 A | 9/2017 |
| KR | 10-2017-0106048 A | 9/2017 |
| KR | 10-2017-0106791 A | 9/2017 |
| KR | 10-2017-0141005 A | 12/2017 |
| KR | 10-2018-0025248 A | 3/2018 |
| KR | 10-2018-0027617 A | 3/2018 |
| KR | 10-1839700 B1 | 3/2018 |
| KR | 10-2018-0059363 A | 6/2018 |
| KR | 10-2018-0059724 A | 6/2018 |
| KR | 10-2018-0080507 A | 7/2018 |
| KR | 10-2018-0092671 A | 8/2018 |
| KR | 10-2018-0106125 A | 10/2018 |
| KR | 10-2018-0111082 A | 10/2018 |
| KR | 10-1895909 B1 | 10/2018 |
| KR | 10-1909541 B1 | 10/2018 |
| KR | 10-2019-0004536 A | 1/2019 |
| KR | 10-2019-0007069 A | 1/2019 |
| KR | 10-2019-0047573 A | 5/2019 |
| KR | 10-2019-0062442 A | 6/2019 |
| KR | 10-1971586 B1 | 6/2019 |
| KR | 10-2019-0095070 A | 8/2019 |
| KR | 10-2019-0102857 A | 9/2019 |
| KR | 10-2019-0108366 A | 9/2019 |
| KR | 10-2019-0110935 A | 10/2019 |
| KR | 10-2019-0112631 A | 10/2019 |
| KR | 10-2020-0041937 A | 4/2020 |
| KR | 10-2020-0060430 A | 5/2020 |
| KR | 10-2226069 B1 | 3/2021 |
| KR | 10-2296792 B1 | 8/2021 |
| TW | 201213452 A1 | 4/2012 |
| TW | 201239044 A1 | 10/2012 |
| TW | 201243002 A1 | 11/2012 |
| TW | 201634604 A | 10/2016 |
| TW | 201643221 A | 12/2016 |
| TW | 201730671 A | 9/2017 |
| TW | 201809216 A | 3/2018 |
| TW | 201825648 A | 7/2018 |
| TW | 201835298 A | 10/2018 |
| TW | 201835652 A | 10/2018 |
| TW | 201920612 A | 6/2019 |
| TW | 201923461 A | 6/2019 |
| TW | 201925420 A | 7/2019 |
| WO | WO 2000/017656 A1 | 3/2000 |
| WO | WO 2005/093422 A2 | 10/2005 |
| WO | WO-2010039897 A2 * | 4/2010 ........... C09K 11/025 |
| WO | WO 2017/002833 | 1/2017 |
| WO | WO 2017/008442 A1 | 1/2017 |
| WO | WO 2017/019789 A1 | 2/2017 |
| WO | WO 2017/150112 A1 | 9/2017 |
| WO | WO 2018/051961 A1 | 3/2018 |
| WO | WO 2018/071308 A1 | 4/2018 |
| WO | WO 2018/105545 A1 | 6/2018 |
| WO | WO 2018/226925 A1 | 12/2018 |
| WO | WO 2019/008374 A1 | 1/2019 |
| WO | WO 2019/030680 A1 | 2/2019 |
| WO | WO 2019/072882 A1 | 4/2019 |
| WO | WO 2019/084119 A1 | 5/2019 |
| WO | WO-2019111617 A1 * | 6/2019 ............ C01B 25/08 |
| WO | WO 2019-167751 A | 9/2019 |

OTHER PUBLICATIONS

Chengbin, Mu, "Communication Optical Fiber and Cable Materials and Industry Development," 1st Edition, Tongji University Press, Jun. 2015, Abstract, 4 pages.

Deng, Dawei et al.; "Forming highly fluorescent near-infrared emitting PbS quantum dots in water using glutathione as surface-modifying molecule"; Journal of Colloid and Interface Science; 367; 2012; pp. 234-240.

(56) References Cited

OTHER PUBLICATIONS

Li Hua, et al., "Research Progress in Synthesis and Application of Quantum Dots," Journal of Jilin Institute of Architecture & Civil Engineering, Dec. 2014, 4 pages.
Ping, He, "Decorative Materials," 1st Edition, Southeast University Press, 2nd printing, Aug. 2002, Abstract, 5 pages.
Yoon, Cheolsang, et al., "High luminescence efficiency white light emitting diodes based on surface functionalized quantum dots dispersed in polymer matrices," Colloids and Surfaces A: Physicochem. Eng. Aspects 428 (2013) 86-91. (Year: 2013).
Zhu, Huaping, et al., "Synthesis and Optical Properties of Thiol Functionalized CdSe/ZnS(Core/Shell) Quantum Dots by Ligand Exchange," Journal of Nanomaterials, 2014, 15 pages.
Study on the properties of QDs with different ligand structures, May 26, 2013, 80 pp.
Chinese Notice of Allowance dated Oct. 21, 2022, issued in Chinese Patent Application No. 201880063935.0 (5 pages).
Chinese Office Action dated Dec. 1, 2021, issued in Chinese Patent Application No. 202010042364.1, 9 pages.
Chinese Office Action dated Jun. 13, 2022, issued in Chinese Patent Application No. 202010042364.1 (8 pages).
Chinese Office Action, Search Report, dated Feb. 25, 2023, issued in corresponding Chinese Patent Application No. 202010022282.0 (3 pages).
Chinese Search Report dated Jun. 9, 2023, issued in corresponding Chinese Patent Application No. 202080048082.0 (3 pages).
Chinese Office Action dated Jun. 16, 2023, issued in Chinese Patent Application No. 202010036364.0 (8 pages).
Chinese Office Action (including a search report) dated Dec. 29, 2021, of the corresponding Chinese Patent Application No. 201880063935.0, 13 pages.
Decision for grant dated Dec. 21, 2021, of the corresponding Japanese Patent Application No. 2020-521309, 3pp.
English translation of Japanese Decision for Grant for JP Application No. JP 2020-521309 dated Dec. 21, 2021, 3 pages.
English translation of Japanese Office Action for JP Application No. JP 2020-521309, dated Apr. 27, 2021, 4 pages.
English translation of Japanese Office Action, for Patent Application No. 2020-006789, mailed Jan. 5, 2021, 3 pages.
Japanese Notice of Allowance dated Feb. 21, 2023, issued in corresponding Japanese Patent Application No. 2021-121430 (3 pages).
Japanese Office Action dated Feb. 16, 2021, issued in Japanese Patent Application Appl. No. 2020-029726, 3 pages.
Japanese Office Action dated Jan. 5, 2021, issued in Japanese Patent Application No. 2020-006250, 4 pages.
Japanese Office Action, for Patent Application No. 2020-006789, mailed Sep. 28, 2021, 3 pages.
Japanese Office Action, for Patent Application No. 2020-006789, mailed Jan. 5, 2021, 3 pages.
English Abstract for foreign reference KR 10-2019-0102857 A, 1 page.
English translation of Korean Intellectual Property Office Action for KR Application No. 10-2018-0023868 dated Jun. 1, 2020, 15 pages.
English translation of Korean Notice of Allowance for KR Application No. 10-2018-0023867 dated Apr. 21, 2021, 2 pages.
English translation of Korean Notification of Third Party Observations for KR Application No. 10-2021-0088862 dated Jan. 26, 2022, 2 pages.
English translation of Korean Office Action for KR Application No. 10-2018-0023867 dated Aug. 19, 2020, 6 pages.
English translation of Korean Office Action, for Patent Application No. 10-2019-0007594, mailed May 7, 2021, 11 pages.
English translation of Korean Office Action, for Patent Application No. 10-2019-0014094, mailed Feb. 28, 2021, 6 pages.
English translation of Korean Office Action, for Patent Application No. 10-2019-0047931, mailed Jul. 22, 2021, 5 pages.
Korean Notice of Allowance dated Jun. 18, 2021, issued in Korean Patent Application No. 10-2019-0014094, 2 pages.
Korean Notification of Third Party Observations, for Patent Application No. KR 10-2021-0088862, mailed Jan. 26, 2022, 2 pages.
Korean Third Party Observations dated Aug. 2, 2022 of the corresponding Korean Patent Application No. 10-2021-0088862 (2 pages).
Korean Office Action dated Aug. 19, 2020, issued in corresponding Korean Patent Application No. 10-2018-0023867 (6 pages).
Korean Office Action for KR Application No. 10-2019-0007594 dated May 28, 2022, 8 pages.
Korean Office Action, for Patent Application No. 10-2019-0007594, mailed May 7, 2021, 10 pages.
Korean Office Action, for Patent Application No. 10-2019-0014094, mailed Feb. 28, 2021, 6 pages.
Korean Office Action, for Patent Application No. 10-2019-0047931, mailed Jul. 22, 2021, 4 pages.
Korean Office Action, with English translation, dated Mar. 28, 2022 for Korean Patent Application No. 10-2019-0007594 (17 pages).
Korean Office Action dated Dec. 28, 2022, issued in Korean Patent No. 10-2296792 (Korean Application No. 10-2019-0014094), 6 pages.
International Search Report and Written Opinion of the International Searching Authority dated on Apr. 13, 2020, for International Application No. PCT/KR2020/000037, 7 pages.
International Search Report issued in corresponding International Application No. PCT/KR2018/006007, dated Sep. 4, 2018, 3 pages.
Taiwanese Office Action dated Dec. 2, 2020, issued in corresponding Taiwanese Patent Application No. 109101093, 6 pages.
Taiwanese Office Action dated Feb. 22, 2021, issued in Taiwanese Patent Application No. 109101173, 9 pages.
Taiwanese Office Action dated Sep. 9, 2019, for corresponding Taiwanese Patent Application No. 107135471 (9 pages).
Taiwanese Patent Office Action and Search Report for corresponding TW App. No. 109101173, dated Jul. 23, 2020, 14 pages.
Taiwanese Patent Office Action and Search Report for corresponding Taiwanese Patent Application No. 109101997, dated Jul. 23, 2020, 16 pages.
U.S. Office Action dated Dec. 14, 2021, issued in U.S. Appl. No. 16/742,875, 12 pages.
US Final Office Action dated Apr. 28, 2023, issued in U.S. Appl. No. 16/742,855 (18 pages).
US Notice of Allowance dated Jan. 19, 2023, issued in U.S. Appl. No. 16/155,691 (7 pages).
U.S. Restriction Requirement from U.S. Appl. No. 16/155,691, dated May 14, 2021, 6 pages.
U.S. Office Action from U.S. Appl. No. 16/155,691, dated Aug. 27, 2021, 12 pages.
U.S. Office Action from U.S. Appl. No. 16/155,691, dated Dec. 13, 2021, 9 pages.
US Office Action for U.S. Appl. No. 16/742,855 dated Dec. 2, 2022, 15 pages.
US Office Action for U.S. Appl. No. 16/742,861 dated Jul. 12, 2022, 9 pages.
US Office Action for U.S. Appl. No. 16/742,875 dated Jul. 18, 2022, 10 pages.
U.S. Final Office Action from U.S. Appl. No. 16/155,691, dated Apr. 11, 2022, 8 pages.
US Final Rejection for U.S. Appl. No. 16/742,875 dated Apr. 11, 2022, 13 pages.
US Restriction Requirement for U.S. Appl. No. 16/742,855 dated Aug. 19, 2022, 7 pages.
US Restriction Requirement for U.S. Appl. No. 16/742,857 dated Nov. 9, 2022, 9 pages.
US Restriction Requirement for U.S. Appl. No. 16/742,861 dated Apr. 28, 2022, 9 pages.
US Notice of Allowance for U.S. Appl. No. 16/155,691 dated Jul. 14, 2022, 8 pages.
US Office Action dated May 19, 2023, issued in U.S. Appl. No. 16/742,857 (9 pages).
US Notice of Allowance dated Oct. 20, 2022, issued in U.S. Appl. No. 16/155,691 (8 pages).
US Notice of Allowance for U.S. Appl. No. 16/742,861 dated Nov. 9, 2022, 10 pages.
US Notice of Allowance for U.S. Appl. No. 16/742,875 dated Nov. 3, 2022, 7 pages.

(56) References Cited

OTHER PUBLICATIONS

US Office Action dated Aug. 4, 2023, issued in U.S. Appl. No. 16/742,855 (15 pages).
Korean Notice of Allowance dated Aug. 28, 2023, issued in Korean Patent Application No. 10-2019-0127122 (3 pages).
US Office Action dated Jun. 14, 2024, issued in U.S. Appl. No. 18/516,818 (8 pages).
Chinese Office Action dated Jun. 20, 2024, issued in Chinese Patent Application No. 202010036364.0 (6 pages).
International Search Report for corresponding PCT International Application No. PCT/KR2020/012595 mailed Dec. 24, 2020, 4pp.
Varga, Krisztina et al.; "CdSe Quantum Dots Functionalized with Chiral, Thiol-Free Carboxylic Acids: Unraveling Structural Requirements for Ligand-Induced Chirality"; ACS Nano 2017; 11; pp. 9846-9853.
Chinese Search Report for corresponding CN Application No. 2020110385025, dated Jun. 14, 2023, 3 pages.
Japanese Office Action for corresponding JP Application No. 2020-165520, dated Jan. 18, 2022, 3 pages.
Japanese Office Action for corresponding JP Application No. 2020-165520, dated Sep. 14, 2021, 3 pages.
Taiwanese Office Action and Search Report, for corresponding TW Application No. 109132996, dated Jun. 9, 2021, 8 pages.
Taiwanese Office Action and Search Report, for the corresponding TW Patent Application No. 109132996, dated Mar. 28, 2022, 8 pages.
US Office Action dated Feb. 10, 2025, issued in U.S. Appl. No. 18/446,373 (13 pages).

* cited by examiner

QUANTUM DOT, CURABLE COMPOSITION COMPRISING THE SAME, CURED LAYER USING THE COMPOSITION, AND COLOR FILTER INCLUDING THE CURED LAYER

CROSS-REFERENCE TO RELATED APPLICATION(S)

This application is a National Phase Patent Application of International Patent Application Number PCT/KR2020/012595, filed on Sep. 18, 2020, which claims priority of Korean Patent Application No. 10-2019-0127122, filed Oct. 14, 2019. The entire contents of both of which are incorporated herein by reference.

BACKGROUND OF THE INVENTION

(a) Field of the Invention

This disclosure relates to a quantum dot, a curable composition including the same, a cured layer produced using the composition, and a color filter including the cured layer.

(b) Description of the Related Art

In the case of general quantum dots, due to surface characteristics having hydrophobicity, a solvent in which it is dispersed is limited, and thus, it is difficult to be introduced into a polar system such as a binder or a curable monomer.

For example, even in the case of a quantum dot ink composition being actively researched, a polarity is relatively low in an initial step and it may be dispersed in a solvent used in the curable composition having a high hydrophobicity. Therefore, because 20 wt % or more of quantum dots are difficult to be included based on a total amount of the composition, it is impossible to increase photoefficiency of the ink over a certain level. Even though the quantum dots are additionally added and dispersed in order to increase photoefficiency, a viscosity exceeds a range (12 cPs) capable of ink-jetting and processability may not be satisfied.

In order to achieve the viscosity range capable of ink-jetting, a method of lowering an ink solid content by dissolving 50 wt % or more of a solvent based on a total amount of the composition, which also provides a somewhat satisfactory result in terms of viscosity. However, it may be considered to be a satisfactory result in terms of a viscosity, but nozzle drying due to solvent volatilization, nozzle clogging, and reduction of a single layer as time passed after jetting may become worse and it is difficult to control a thickness deviation after curing. Thus, it is difficult to apply it to actual processes.

Therefore, a solvent-free quantum dot ink that does not include a solvent is the most desirable form to be applied to an actual process. The current technique of applying a quantum dot itself to a solvent type composition is now limited to a certain extent.

Currently, the most desirable solvent type composition to be applied to actual processes is that the quantum dot, which is not surface-modified, such as ligand-substitution, has a content of 20 wt % to 25 wt % based on a total amount of a solvent type composition. Therefore, it is difficult to increase photoefficiency and absorption rate due to a viscosity limit. Meanwhile, attempts have been made to lower the quantum dot content and increase the content of the light diffusing agent (scatterer) in other improvement directions, but this has also failed to solve a precipitation problem and a low photoefficiency problem.

DISCLOSURE

Technical Problem

An embodiment provides a quantum dot that is surface-modified with a compound having an improved passivation effect and thus exhibits improved photoefficiency.

Another embodiment provides a quantum dot-containing curable composition.

Another embodiment provides a cured layer produced using the curable composition.

Another embodiment provides a color filter including the cured layer.

Technical Solution

An embodiment provides a quantum dot surface-modified with a compound represented by Chemical Formula 1.

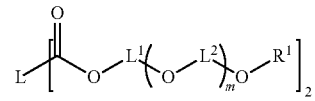

[Chemical Formula 1]

In Chemical Formula 1,

L is a divalent moiety derived from acid dianhydride, $L^1$ and $L^2$ are independently a substituted or unsubstituted C1 to C20 alkylene group, $R^1$ is a substituted or unsubstituted C1 to C20 alkyl group or a substituted or unsubstituted C6 to C20 aryl group, and m is an integer of 1 to 20.

L may be a divalent moiety derived from a compound represented by one of Chemical Formula 2-1 to Chemical Formula 2-15.

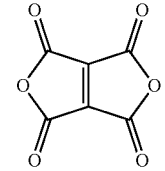

[Chemical Formula 2-1]

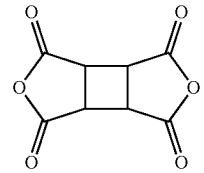

[Chemical Formula 2-2]

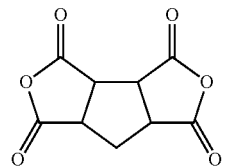

[Chemical Formula 2-3]

[Chemical Formula 2-4]
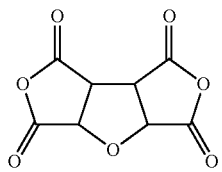
[Chemical Formula 2-5]
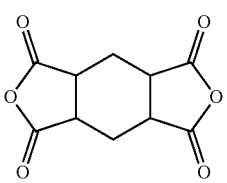
[Chemical Formula 2-6]
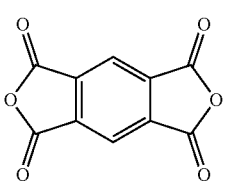
[Chemical Formula 2-7]
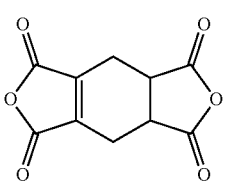
[Chemical Formula 2-8]
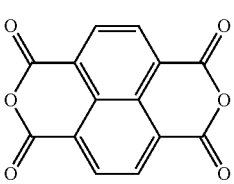
[Chemical Formula 2-9]
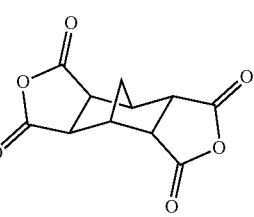
[Chemical Formula 2-10]
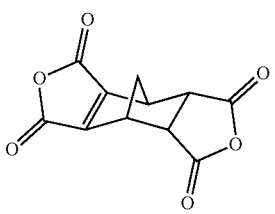
[Chemical Formula 2-11]
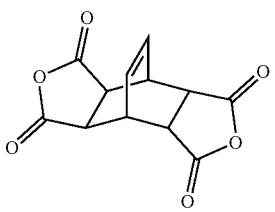
[Chemical Formula 2-12]
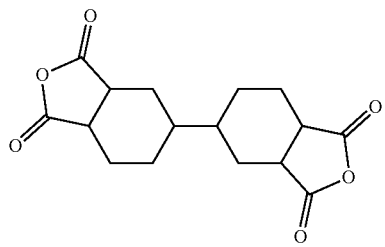
[Chemical Formula 2-13]
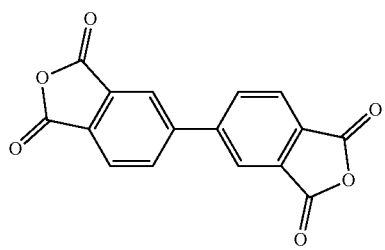
[Chemical Formula 2-14]
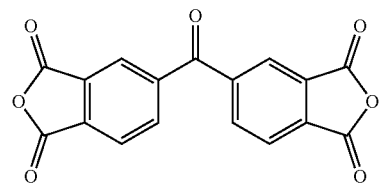
[Chemical Formula 2-15]
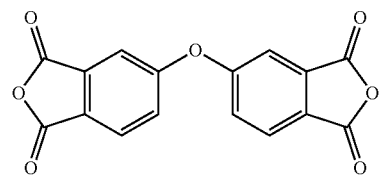
The L may be represented by one selected from Group 1.
[Group 1]
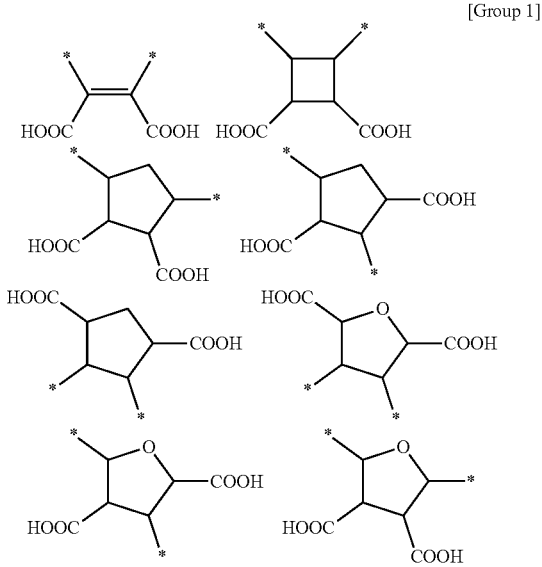

-continued
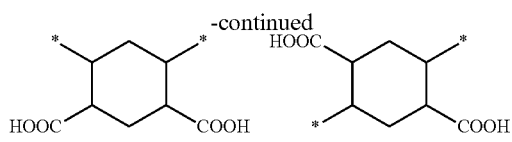
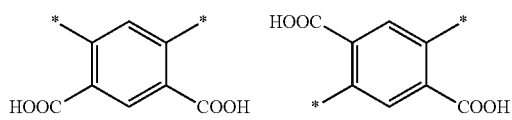
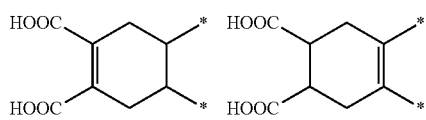
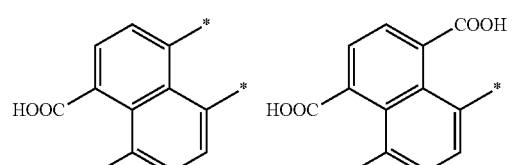
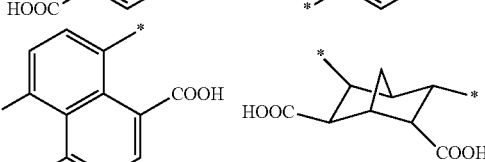
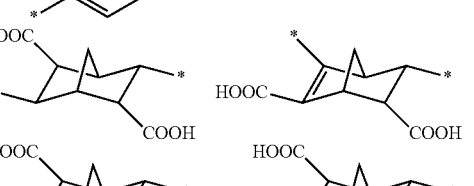
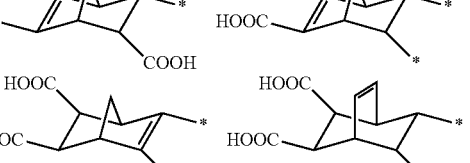
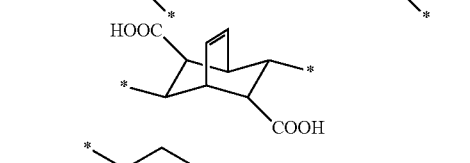
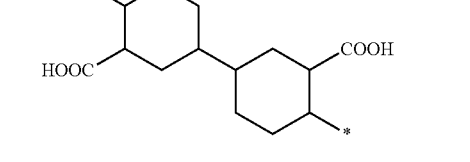
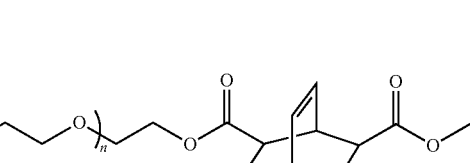
-continued
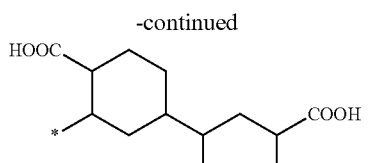
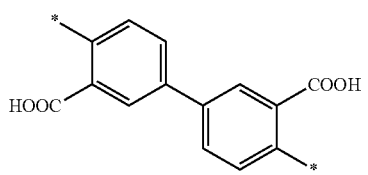
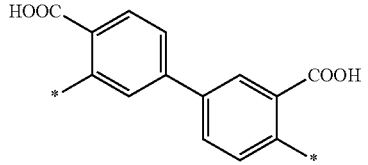
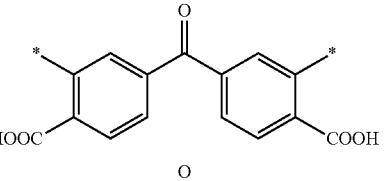
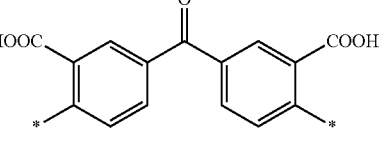
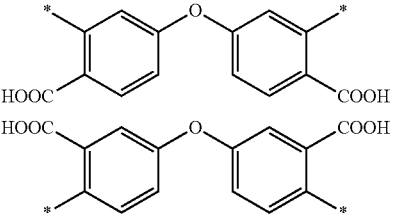
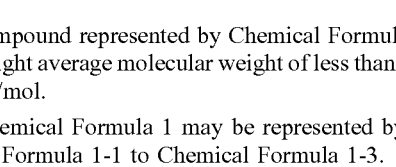
The compound represented by Chemical Formula 1 may have a weight average molecular weight of less than or equal to 2000 g/mol.
The Chemical Formula 1 may be represented by one of Chemical Formula 1-1 to Chemical Formula 1-3.
[Chemical Formula 1-1]
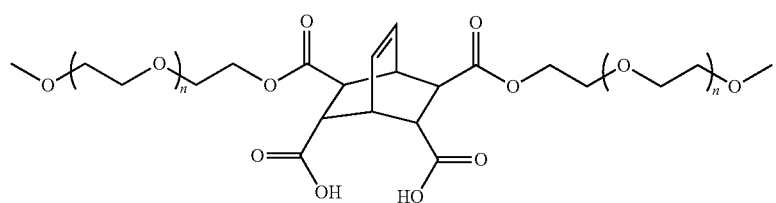

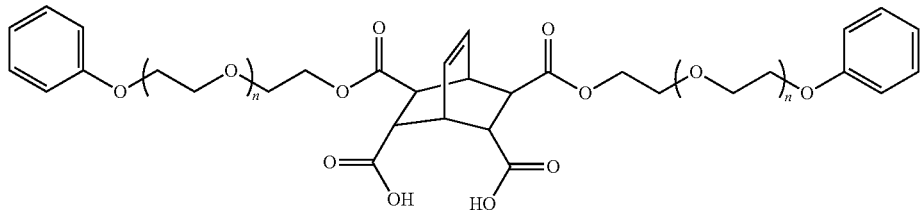

[Chemical Formula 1-2]

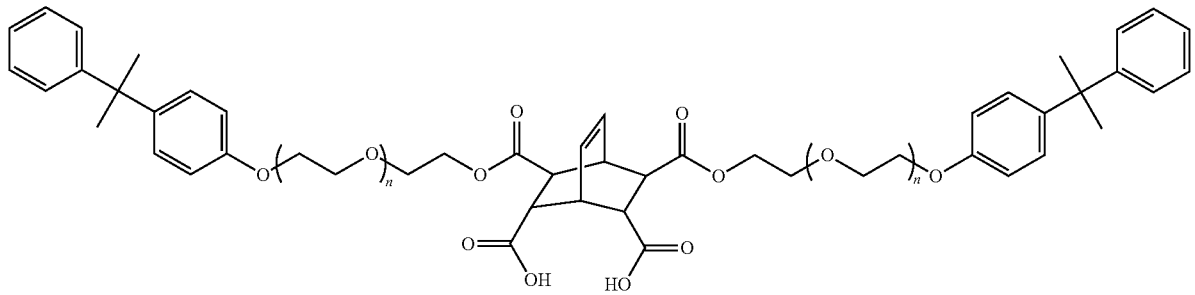

[Chemical Formula 1-3]

In Chemical Formula 1-1 to Chemical Formula 1-3,
n is an integer of 1 to 20.

The quantum dots may have a maximum fluorescence emission wavelength from 500 nm to 680 nm.

Another embodiment provides a solvent-free curable composition including the quantum dots and polymerizable monomers having a carbon-carbon double bond at the terminal end.

The polymerizable monomers in the solvent-free curable composition may have a molecular weight of 220 g/mol to 1,000 g/mol.

The polymerizable monomers in the solvent-free curable composition may be represented by Chemical Formula 3.

[Chemical Formula 3]

$$\underset{R^2}{\overset{O}{\parallel}}\!\!=\!\!\!\overset{}{\underset{}{}}\!\!-\!\!C\!-\!O\!-\!L^7\!-\!L^8\!-\!L^9\!-\!O\!-\!C\!\overset{O}{\underset{R^3}{\parallel}}\!\!=$$

In Chemical Formula 3,
$R^2$ and $R^3$ are independently a hydrogen atom or a substituted or unsubstituted C1 to C10 alkyl group,
$L^7$ and $L^9$ are independently a substituted or unsubstituted C1 to C10 alkylene group, and
$L^8$ is a substituted or unsubstituted C1 to C10 alkylene group, or an ether group (*—O—*).

The solvent-free curable composition may include 1 wt % to 60 wt % of the quantum dots and 40 wt % to 99 wt % of the polymerizable monomers.

The solvent-free curable composition may further include a polymerization initiator, a light diffusing agent, or a combination thereof.

Another embodiment provides a solvent type curable composition including the quantum dots, a binder resin, and a solvent.

The solvent type curable composition may include 1 wt % to 40 wt % of the quantum dots; 1 wt % to 30 wt % of the binder resin; and a balance amount of the solvent.

The solvent type curable composition may further include a polymerizable monomer, a polymerization initiator, a light diffusing agent, or a combination thereof.

Another embodiment provides a cured layer produced using the curable composition.

Another embodiment provides a color filter including the cured layer.

Other embodiments of the present invention are included in the following detailed description.

Advantageous Effects

An embodiment provides a quantum dot surface-modified with a specific compound, the specific compound has a very good passivation effect on the quantum dots, the quantum dot surface-modified with the compound may be easily applied to both the solvent type curable composition and the solvent-free curable composition compared with the existing quantum dots, and not only has excellent processability, but also greatly improves the photoefficiency of the cured layer produced using the composition. Furthermore, the curable composition including quantum dots according to an embodiment has improved storage stability and heat resistance.

BEST MODE

Hereinafter, embodiments of the present invention are described in detail. However, these embodiments are exemplary, the present invention is not limited thereto and the present invention is defined by the scope of claims.

In the present specification, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 heteroarylene group, and "alkoxylene group" refers to a C1 to C20 alkoxylene group.

In the present specification, when specific definition is not otherwise provided, "substituted" refers to replacement of at least one hydrogen atom by a substituent selected from a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

In the present specification, when specific definition is not otherwise provided, "hetero" refers to inclusion of at least one heteroatom of N, O, S, and P, in the chemical formula.

In the present specification, when specific definition is not otherwise provided, "(meth)acrylate" refers to both "acrylate" and "methacrylate", and "(meth)acrylic acid" refers to "acrylic acid" and "methacrylic acid".

In the present specification, when specific definition is not otherwise provided, the term "combination" refers to mixing or copolymerization.

In the present specification, when a definition is not otherwise provided, hydrogen is bonded at the position when a chemical bond is not drawn in chemical formula where supposed to be given.

In the present specification, a cardo-based resin refers to a resin including at least one functional group selected from Chemical Formula 4-1 to Chemical Formula 4-11 in the backbone of the resin.

In addition, in the present specification, when a definition is not otherwise provided, "*" refers to a linking point with the same or different atom or chemical formula.

In general, since quantum dots are dispersed in limited solvents due to hydrophobic surface characteristics, there are lots of difficulties in introducing the quantum dots into a polar system such as a binder resin, a curable monomer, or the like.

For example, a quantum dot-containing curable composition, which is actively researched, is prepared by barely dispersing the quantum dots in a curable composition having a relatively low polarity and high hydrophobicity in the initial step. Accordingly, since the quantum dots are hardly included in a high content of greater than or equal to 20 wt % based on a total amount of the composition, photoefficiency of the curable composition may not be increased over a certain level, and in order to increase the photoefficiency, the quantum dots may be additionally excessively added and dispersed but not satisfy processability over a viscosity range (12 cPs) that ink-jetting is applicable.

In addition, in order to realize the viscosity range that the ink-jetting is applicable, a method of including a solvent in an amount of greater than or equal to 50 wt % based on the total amount of the curable composition and thus reducing a solid content therein may be used and thus bring about excellent viscosity but have drawbacks of being hardly applied to actual processes due to nozzle drying according to solvent volatilization during the ink-jetting, nozzle clogging, single film thickness reduction over time after the ink-jetting, and severe thickness deviation after the curing.

Accordingly, the quantum dot-curing curable composition, considering that a solvent-free type composition including no solvent is a development approach applicable to the actual processes, has a limit to applying the current quantum dots.

So far reported, the quantum dots, which are not surface-modified such as ligand substitution and the like, are included in a small amount of 20 wt % to 25 wt % based on the total amount of the curable composition, and accordingly, the photoefficiency and an absorption rate are difficult to increase due to the viscosity limitation. In addition, another development approach is a method of decreasing the content of the quantum dots and increasing a content of a light diffuser such as $TiO_2$ and the like, which also fails in improving the precipitation problem or the low photoefficiency.

A conventional solvent type curable composition including the quantum dots may cause nozzle-clogging due to solvent drying in the nozzle during the ink-jetting as described above, not maintain a target pixel thickness due to ink evaporation in the ink-jetted pixel, and thus not secure ink-jetting processability.

In addition, in order to form a layer having a predetermined thickness through post-baking (or additionally thermal-curing) after forming a thin film in the pixel, a pinning point (a maximum height where a bubble does not collapse) should be formed by ink-jetting a large amount of ink far above the pixel height, which is practically impossible, and in addition, the processible solvent should have a surface tension close to 40 dyne/cm, which is rarely possible to develop.

Accordingly, the present inventors have researched for a long time and disclose a method of surface-modifying the quantum dots with a ligand having no thiol group and thus a different structure from that of a ligand conventionally used for surface-modifying the quantum dots but including a divalent moiety derived from dianhydride to prevent optical property deterioration of the quantum dots and simultaneously, greatly improve storage stability and heat resistance of the quantum dot-containing curable composition.

For example, the ligand may be represented by Chemical Formula 1.

[Chemical Formula 1]

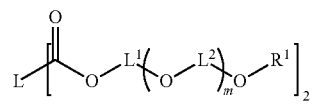

In Chemical Formula 1,

L is a divalent moiety derived from acid dianhydride, $L^1$ and $L^2$ are independently a substituted or unsubstituted C1 to C20 alkylene group, $R^1$ is a substituted or unsubstituted C1 to C20 alkyl group or a substituted or unsubstituted C6 to C20 aryl group, and m is an integer of 1 to 20.

The compound represented by Chemical Formula 1 is a ligand having a different structure from a thiol-based compound conventionally used as a material for surface-modifying quantum dots and derived from acid dianhydride, and when used for surface-modifying the quantum dots, the surface-modified quantum dots may greatly improve photoefficiency of a cured layer formed of the quantum dot-containing composition and furthermore enhance storage stability and heat resistance of the composition.

For example, L may be a divalent moiety derived from a compound represented by one of Chemical Formula 2-1 to Chemical Formula 2-15, but is not limited thereto.

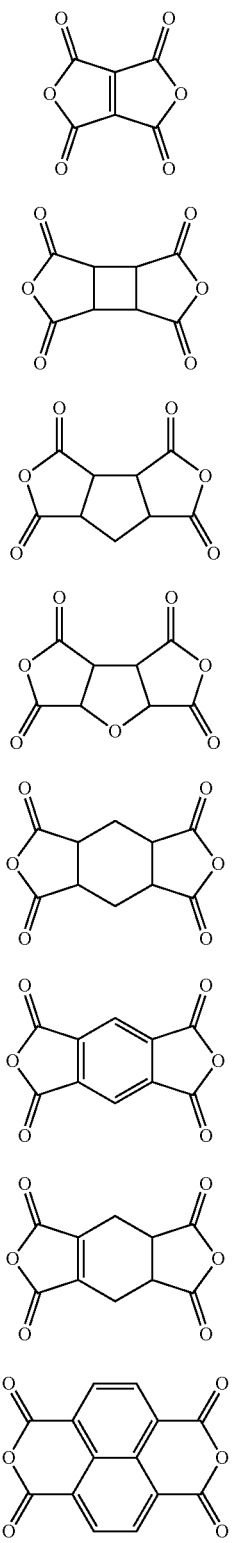

[Chemical Formula 2-1]

[Chemical Formula 2-2]

[Chemical Formula 2-3]

[Chemical Formula 2-4]

[Chemical Formula 2-5]

[Chemical Formula 2-6]

[Chemical Formula 2-7]

[Chemical Formula 2-8]

[Chemical Formula 2-9]

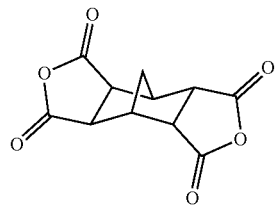

[Chemical Formula 2-10]

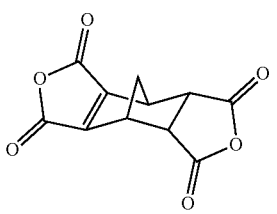

[Chemical Formula 2-11]

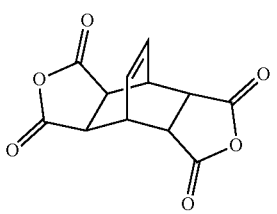

[Chemical Formula 2-12]

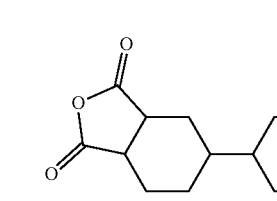

[Chemical Formula 2-13]

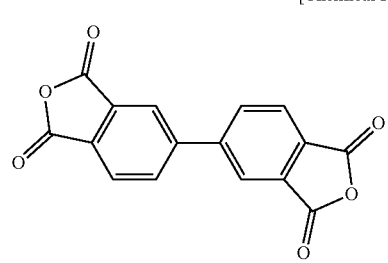

[Chemical Formula 2-14]

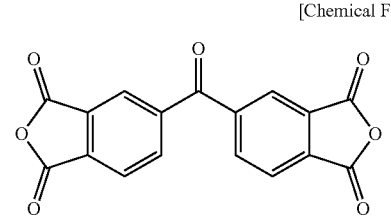

[Chemical Formula 2-15]

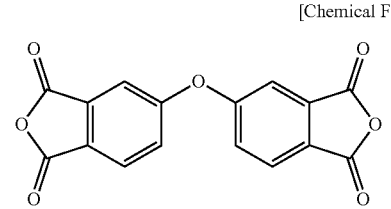

For example, the L may be represented by one selected from Group 1, but is not limited thereto.

[Group 1]

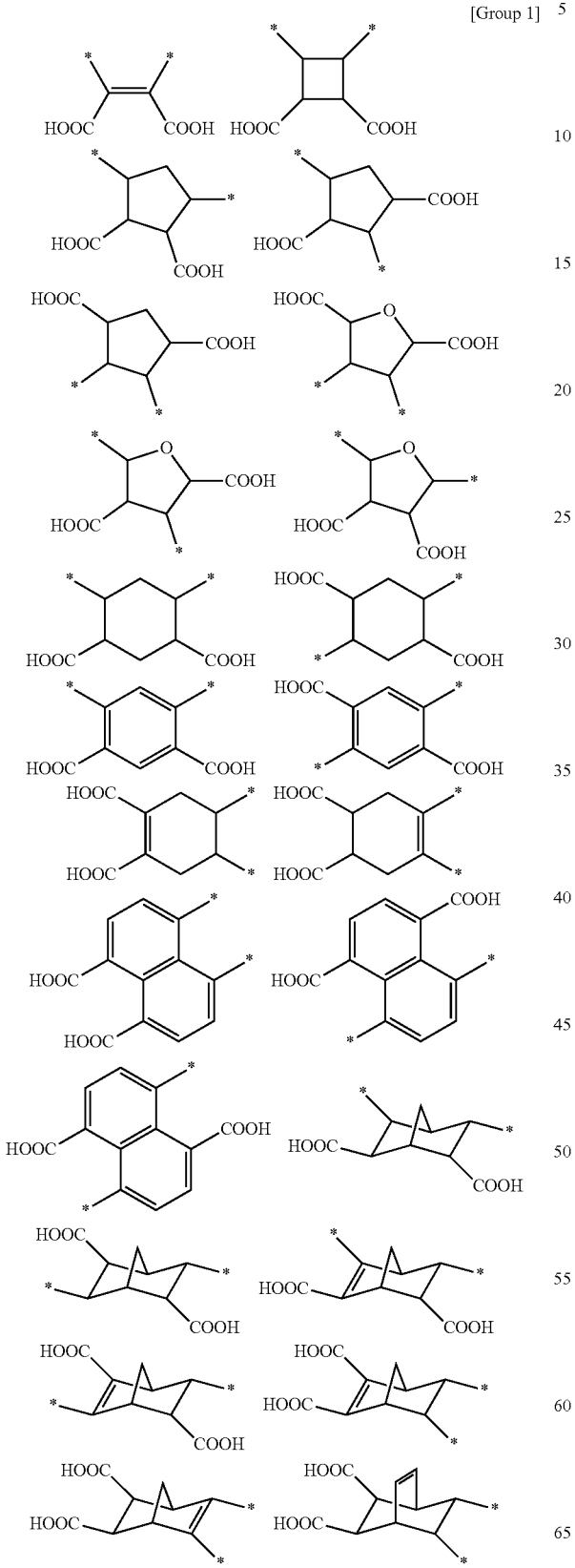

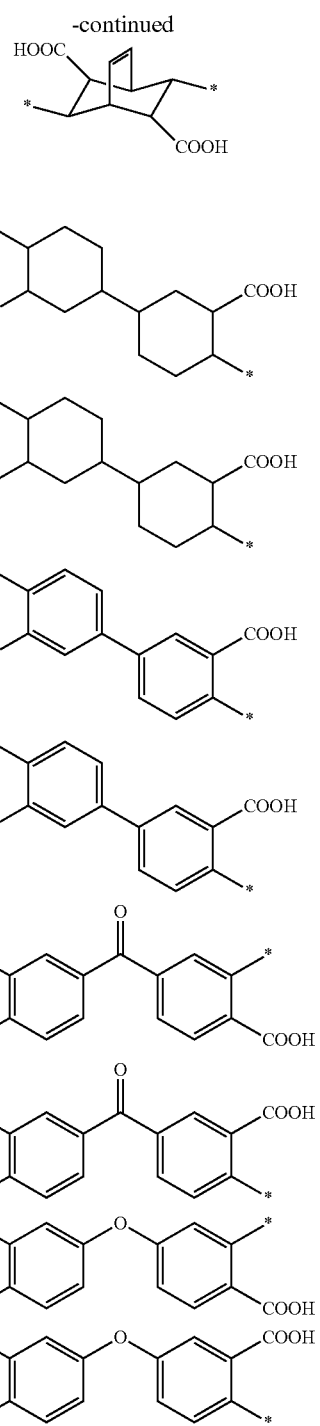

The compound represented by Chemical Formula 1 may have a weight average molecular weight of less than or equal to 2000 g/mol, for example 400 to 2000 g/mol. When the compound represented by Chemical Formula 1 has a weight average molecular weight in the above range, a viscosity of the curable composition including quantum dots surface-modified with the compound may be kept low, which may be advantageous for ink-jetting.

For example, Chemical Formula 1 may be represented by one of Chemical Formula 1-1 to Chemical Formula 1-3, but is not limited thereto.

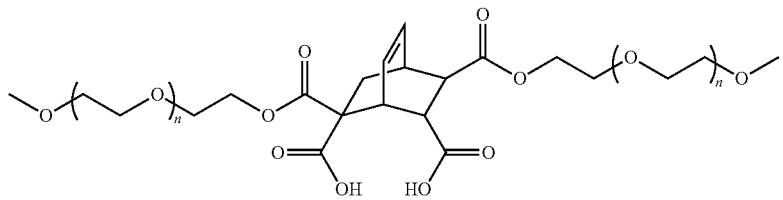
[Chemical Formula 1-1]

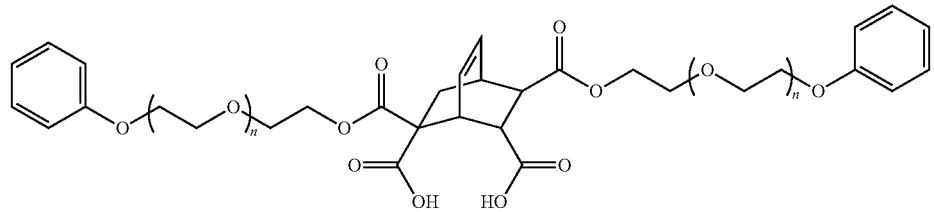
[Chemical Formula 1-2]

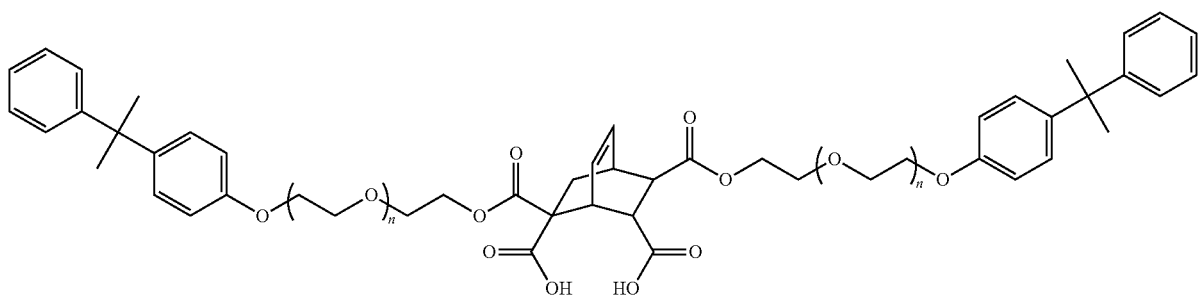
[Chemical Formula 1-3]

In Chemical Formula 1-1 to Chemical Formula 1-3, n is an integer of 1 to 20.

The quantum dots may have a maximum fluorescence emission wavelength from 500 nm to 680 nm.

The curable composition according to another embodiment includes quantum dots surface-modified with the compound represented by Chemical Formula 1.

Until now, the quantum dot-containing curable composition (ink) may have been developed toward specializing monomers having good compatibility with quantum dots, and furthermore, their commercialization has been made.

On the other hand, since a generally and widely used polymerizable monomer, an -ene-based monomer (including a vinyl-based monomer, an acrylate-based monomer, a methacrylate-based monomer, and the like which include a mono-functional monomer or a multi-functional monomer) has low compatibility with the quantum dots and is limited in terms of dispersibility of the quantum dots, various developments for usefully applying it to the quantum dot-containing curable composition are substantially difficult. Above all, the -ene-based monomer shows no high concentration quantum dot dispersibility and thus has difficulties in being applied to the quantum dot-containing curable composition.

Because of this drawback, the quantum dot-containing curable composition has been developed to have a composition of including a solvent in a considerable amount (greater than or equal to 50 wt %), but when the solvent content is increased, ink-jetting processability may be deteriorated. Accordingly, in order to satisfy the ink-jetting processability, a demand of a solvent-free curable composition is continuously increased.

The present invention provides the solvent-free curable composition, whose demand is increased, by using a polymerizable monomer including a compound having a carbon-carbon double bond at the terminal end along with quantum dots surface-modified by the compound represented by Chemical Formula 1 or Chemical Formula 2 to improve affinity of the quantum dots for a curable composition and thus obtaining high-concentration dispersion of the quantum dots even in a solvent-free system and in addition, accomplishing a passivation of not deteriorating inherent optical properties of the quantum dots.

Hereinafter, each component constituting the solvent-free curable composition is described in detail.

Quantum Dots

Quantum dots included in the solvent-free curable composition include quantum dots surface-modified with the compound represented by Chemical Formula 1.

For example, the quantum dots absorb light in a wavelength region of 360 nm to 780 nm, for example 400 nm to 780 nm and emits fluorescence in a wavelength region of 500 nm to 700 nm, for example 500 nm to 580 nm, or emits fluorescence in a wavelength region of 600 nm to 680 nm. That is, the quantum dots may have a maximum fluorescence emission wavelength (fluorescence $\lambda_{em}$) at 500 nm to 680 nm.

The quantum dots may independently have a full width at half maximum (FWHM) of 20 nm to 100 nm, for example 20 nm to 50 nm. When the quantum dots have a full width at half maximum (FWHM) of the ranges, color reproducibility is increased when used as a color material in a color filter due to high color purity.

The quantum dots may independently be an organic material, an inorganic material, or a hybrid (mixture) of an organic material and an inorganic material.

The quantum dots may independently be composed of a core and a shell surrounding the core, and the core and the shell may independently have a structure of a core, core/shell, core/first shell/second shell, alloy, alloy/shell, and the like composed of Group II-IV, Group III-V, and the like but are not limited thereto.

For example, the core may include at least at least one material selected from CdS, CdSe, CdTe, ZnS, ZnSe, ZnTe, HgS, HgSe, HgTe, GaN, GaP, GaAs, InP, InAs, and an alloy thereof, but is not necessarily limited thereto. The shell surrounding the core may include at least at least one material selected from CdSe, ZnSe, ZnS, ZnTe, CdTe, PbS, TiO, SrSe, HgSe, and an alloy thereof, but is not necessarily limited thereto.

In an embodiment, since an interest in an environment has been recently much increased over the whole world, and a restriction of a toxic material also has been fortified, a cadmium-free light emitting material (InP/ZnS, InP/ZnSe/ZnS, etc.) having little low quantum efficiency (quantum yield) but being environmentally-friendly instead of a light emitting material having a cadmium-based core is used, but not necessarily limited thereto.

In the case of the quantum dots of the core/shell structure, an entire size including the shell (an average particle diameter) may be 1 nm to 15 nm, for example, 5 nm to 15 nm.

For example, the quantum dots may independently include red quantum dots, green quantum dots, or a combination thereof. The red quantum dots may independently have an average particle diameter of 10 nm to 15 nm. The green quantum dots may independently have an average particle diameter of 5 nm to 8 nm.

On the other hand, for dispersion stability of the quantum dot, the solvent-free curable composition according to an embodiment may further include a dispersing agent. The dispersing agent helps uniform dispersibility of light conversion materials such as quantum dots in the solvent-free curable composition and may include a non-ionic, anionic, or cationic dispersing agent. Specifically, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and the like, and they may be used alone or in a mixture of two or more. The dispersing agent may be used in an amount of 0.1 wt % to 100 wt %, for example 10 wt % to 20 wt % relative to a solid content of the light conversion material such as quantum dots.

The quantum dots surface-modified with Chemical Formula 1 may be included in an amount of 1 wt % to 60 wt %, for example 3 wt % to 50 wt % based on a total amount of the solvent-free curable composition. When the surface-modified quantum dots are included within the ranges, a light conversion rate may be improved, and pattern characteristics and development characteristics are not interfered, so that it may have excellent processability.

Polymerizable Monomers Having Carbon-Carbon Double Bond at the Terminal End

The monomer having the carbon-carbon double bond at the terminal end should be included in an amount of 40 wt % to 99 wt %, for example 50 wt % to 97 wt % based on a total amount of the solvent-free curable composition. When the monomer having the carbon-carbon double bond at the terminal end is included within the ranges, a solvent-free curable composition having a viscosity that enables ink-jetting may be prepared and the quantum dots in the prepared solvent-free curable composition may have improved dispersibility, thereby improving optical properties.

For example, the monomer having the carbon-carbon double bond at the terminal end may have a molecular weight of 220 g/mol to 1,000 g/mol. When the monomer having the carbon-carbon double bond at the terminal end has a molecular weight within the range, it may be advantageous for ink-jetting because it does not increase a viscosity of the composition without hindering the optical properties of the quantum dots.

For example, the monomer having the carbon-carbon double bond at the terminal end may be represented by Chemical Formula 3, but is not necessarily limited thereto.

[Chemical Formula 3]

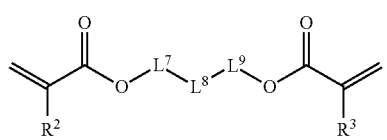

In Chemical Formula 3,
$R^2$ and $R^3$ are independently a hydrogen atom or a substituted or unsubstituted C1 to C10 alkyl group,
$L^7$ and $L^9$ are independently a substituted or unsubstituted C1 to C10 alkylene group, and
$L^8$ is a substituted or unsubstituted C1 to C10 alkylene group, or an ether group (*—O—*).

For example, the monomer having the carbon-carbon double bond at the terminal end may be represented by Chemical Formula 3-1 or 3-2, but is not necessarily limited thereto.

[Chemical Formula 3-1]

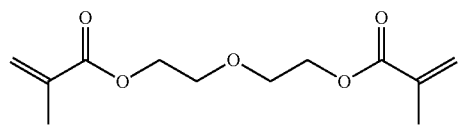

[Chemical Formula 3-2]

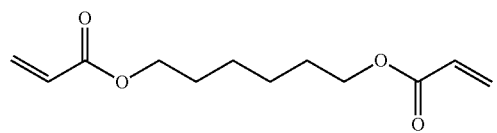

For example, the monomer having the carbon-carbon double bond at the terminal end may further include ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, triethylene glycoldimethacrylate, propylene glycoldimethacrylate, 1,4-butanedioldimethacrylate, 1,6-hexanedioldimethacrylate, or a combination thereof, in addition to the aforementioned compound of Chemical Formula 3-1 or Chemical Formula 3-2.

In addition, together with the monomer having the carbon-carbon double bond at the terminal end, a generally-used monomer of a conventional thermosetting or photocurable composition may be further included. For example the monomer further include an oxetane-based compound such as bis[1-ethyl (3-oxetanyl)]methyl ether, and the like.

Polymerization Initiator

A solvent-free curable composition according to an embodiment may further include a polymerization initiator, for example, a photopolymerization initiator, a thermal polymerization initiator, or a combination thereof.

The photopolymerization initiator is a generally-used initiator for a photosensitive resin composition, for example an acetophenone-based compound, a benzophenone-based compound, a thioxanthone-based compound, a benzoin-based compound, a triazine-based compound, an oxime-based compound, an aminoketone-based compound, and the like, but is not necessarily limited thereto.

Examples of the acetophenone-based compound may be 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethylamino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may be benzoin, benzoin methyl ether, benzoin ethyl ether, benzoin isopropyl ether, benzoin isobutyl ether, benzyldimethylketal, and the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphthol-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime-based compound may be O-acyloxime-based compound, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like. Specific examples of the O-acyloxime-based compound may be 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and the like.

Examples of the aminoketone-based compound may be 2-benzyl-2-dimethylamino-1-(4-morpholinophenyl)-butanone-1, and the like.

The photopolymerization initiator may further include a carbazole-based compound, a diketone-based compound, a sulfonium borate-based compound, a diazo-based compound, an imidazole-based compound, a biimidazole-based compound, and the like, besides the compounds.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

Examples of the thermal polymerization initiator may be peroxide, specifically benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azo-bis(isobutyronitrile), t-butyl perbenzoate, and the like, for example 2,2'-azobis-2-methylpropinonitrile, but are not necessarily limited thereto and any of which is well known in the art may be used.

The polymerization initiator may be included in an amount of 0.1 wt % to 5 wt %, for example 1 wt % to 4 wt % based on a total amount of the solvent-free curable composition. When the polymerization initiator is included in the ranges, it is possible to obtain excellent reliability due to sufficient curing during exposure or thermal curing and to prevent deterioration of transmittance due to non-reaction initiators, thereby preventing deterioration of optical properties of the quantum dots.

Light Diffusing Agent (or Light Diffusing Agent Dispersion)

The solvent-free curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or a combination thereof.

The light diffusing agent may reflect unabsorbed light in the aforementioned quantum dots and allows the quantum dots to absorb the reflected light again. That is, the light diffusing agent may increase an amount of light absorbed by the quantum dots and increase light conversion efficiency of the curable composition.

The light diffusing agent may have an average particle diameter ($D_{50}$) of 150 nm to 250 nm, and specifically 180 nm to 230 nm. When the average particle diameter of the light diffusing agent is within the ranges, it may have a better light diffusing effect and increase light conversion efficiency.

The light diffusing agent may be included in an amount of 1 wt % to 20 wt %, for example 5 wt % to 10 wt % based on a total amount of the solvent-free curable composition. When the light diffusing agent is included in an amount of less than 1 wt % based on a total amount of the solvent-free curable composition, it is difficult to expect a light conversion efficiency improvement effect due to the use of the light diffusing agent, while when it is included in an amount of greater than 20 wt %, there is a possibility that the quantum dots may be precipitated.

Other Additives

For stability and dispersion improvement of the quantum dot, the solvent-free curable composition according to an embodiment may further include a polymerization inhibitor.

The polymerization inhibitor may include a hydroquinone-based compound, a catechol-based compound, or a combination thereof, but is not necessarily limited thereto. When the solvent-free curable composition according to an embodiment further includes the hydroquinone-based compound, the catechol-based compound, or the combination thereof, room temperature cross-linking during exposure after coating the solvent-free curable composition may be prevented.

For example, the hydroquinone-based compound, the catechol-based compound, or the combination thereof may be hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminum, or a combination thereof, but are not necessarily limited thereto.

The hydroquinone-based compound, the catechol-based compound, or the combination thereof may be used in a form of dispersion. The polymerization inhibitor in a form of dispersion may be included in an amount of 0.001 wt % to 3 wt %, for example 0.1 wt % to 2 wt % based on a total amount of the solvent-free curable composition. When the polymerization inhibitor is included in the ranges, passage of time at room temperature may be solved and simultaneously sensitivity deterioration and surface delamination phenomenon may be prevented.

In addition, the solvent-free curable composition according to an embodiment may further include malonic acid; 3-amino-1,2-propanediol; a silane-based coupling agent; a leveling agent; a fluorine-based surfactant; or a combination thereof in order to improve heat resistance and reliability.

For example, the solvent-free curable composition according to embodiment may further include a silane-based coupling agent having a reactive substituent such as a vinyl group, a carboxyl group, a methacryloxy group, an isocyanate group, an epoxy group and the like in order to improve close contacting properties with a substrate.

Examples of the silane-based coupling agent may be trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexyl)pethyltrimethoxysilane, and the like, and these may be used alone or in a mixture of two or more.

The silane-based coupling agent may be used in an amount of 0.01 parts by weight to 10 parts by weight based on 100 parts by weight of the solvent-free curable composition. When the silane-based coupling agent is included within the range, close contacting properties, storage capability, and the like are improved.

In addition, the solvent-free curable composition may further include a surfactant, for example a fluorine-based surfactant as needed in order to improve coating properties and inhibit generation of spots, that is, improve leveling performance.

The fluorine-based surfactant may have a low weight average molecular weight of 4,000 g/mol to 10,000 g/mol, and specifically 6,000 g/mol to 10,000 g/mol. In addition, the fluorine-based surfactant may have a surface tension of mN/m to 23 mN/m (measured in a 0.1% polyethylene glycol monomethylether acetate (PGMEA) solution). When the fluorine-based surfactant has a weight average molecular weight and a surface tension within the ranges, leveling performance may be further improved, and excellent characteristics may be provided when slit coating as high speed coating is applied since film defects may be less generated by preventing a spot generation during the high speed coating and suppressing a vapor generation.

Examples of the fluorine-based surfactant may be, BM-1000®, and BM-1100® (BM Chemie Inc.); MEGAFACE F 142D®, F 172®, F 173®, and F 183® Dainippon Ink Kagaku Kogyo Co., Ltd.); FULORAD FC-135®, FULORAD FC-170C®, FULORAD FC-430®, and FULORAD FC-431® (Sumitomo 3M Co., Ltd.); SURFLON S-112®, SURFLON S-113®, SURFLON S-131®, SURFLON S-141®, and SURFLON S-145® (ASAHI Glass Co., Ltd.); and SH-28PA®, SH-190®, SH-193®, SZ-6032®, and SF-8428®, and the like (Toray Silicone Co., Ltd.); F-482, F-484, F-478, F-554, and the like of DIC Co., Ltd.

In addition, the solvent-free curable composition according to an embodiment may include a silicone-based surfactant in addition to the fluorine-based surfactant. Specific examples of the silicone-based surfactant may be TSF400, TSF401, TSF410, TSF4440, and the like of Toshiba silicone Co., Ltd., but is not limited thereto.

The surfactant may be included in an amount of 0.01 parts by weight to 5 parts by weight, for example 0.1 parts by weight to 2 parts by weight based on 100 parts by weight of the solvent-free curable composition. When the surfactant is included within the ranges, foreign materials are less produced in a sprayed composition.

In addition, the solvent-free curable composition according to an embodiment may further include other additives such as an antioxidant, a stabilizer, and the like in a predetermined amount, unless properties are deteriorated.

For example, the curable composition may include a solvent type curable composition including the quantum dots surface-modified with Chemical Formula 1, a binder resin, and a solvent, besides the solvent-free curable composition. Herein, the surface-modified quantum dots may be included in an amount of 1 wt % to 40 wt % based on a total weight of the solvent type curable composition. When the surface-modified quantum dot is included within the content range based on a total amount of the solvent type curable composition, it may be advantageous in terms of processability.

Hereinafter, each component constituting the solvent type curable composition is described in detail.

Binder Resin

The binder resin may include an acryl-based resin, a cardo-based resin, an epoxy resin, or a combination thereof.

The acryl-based resin may be a copolymer of a first ethylenic unsaturated monomer and a second ethylenic unsaturated monomer that is copolymerizable therewith, and may be a resin including at least one acryl-based repeating unit.

The first ethylenic unsaturated monomer may be an ethylenic unsaturated monomer including at least one carboxyl group and examples of the monomer may include acrylic acid, methacrylic acid, maleic acid, itaconic acid, fumaric acid, or a combination thereof.

The first ethylenic unsaturated monomer may be included in an amount of 5 wt % to 50 wt %, for example, 10 wt % to 40 wt % based on a total amount of the acryl-based binder resin.

The second ethylenic unsaturated monomer may be an aromatic vinyl compound such as styrene, α-methylstyrene, vinyl toluene, vinylbenzylmethylether and the like; an unsaturated carboxylate ester compound such as methyl (meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; an unsaturated amino alkyl carboxylate ester compound such as 2-aminoethyl(meth)acrylate, 2-dimethylaminoethyl(meth)acrylate, and the like;

a carboxylic acid vinyl ester compound such as vinyl acetate, vinyl benzoate, and the like; an unsaturated glycidyl carboxylate ester compound such as glycidyl(meth)acrylate, and the like; a vinyl cyanide compound such as (meth)acrylonitrile, and the like; an unsaturated amide compound such as (meth)acrylamide, and the like; and the like, and may be used alone or as a mixture of two or more.

Specific examples of the acryl-based binder resin may be polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer, and the like, but are not limited thereto, and may be used alone or as a mixture of two or more.

A weight average molecular weight of the acryl-based binder resin may be 5,000 g/mol to 15,000 g/mol. When the acryl-based binder resin has a weight average molecular weight within the ranges, close contacting properties to a substrate, physical and chemical properties are improved, and a viscosity is appropriate.

The cardo-based resin may include a repeating unit represented by Chemical Formula 4.

[Chemical Formula 4]

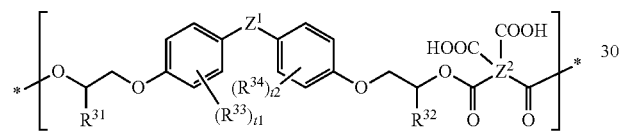

In Chemical Formula 4,
$R^{31}$ and $R^{32}$ are independently a hydrogen atom or a substituted or unsubstituted (meth)acryloyloxy alkyl group,
$R^{33}$ and $R^{34}$ are independently a hydrogen atom, a halogen atom, or a substituted or unsubstituted C1 to C20 alkyl group,
$Z^1$ is a single bond, O, CO, $SO_2$, $CR^{35}R^{36}$, $SiR^{37}R^{38}$ (wherein, $R^{35}$ to $R^{38}$ are independently a hydrogen atom or a substituted or unsubstituted C1 to C20 alkyl group), or one of linking groups represented by Chemical Formula 4-1 to Chemical Formula 4-11,

[Chemical Formula 4-1]

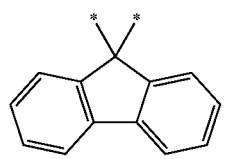

[Chemical Formula 4-2]

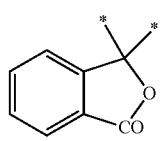

[Chemical Formula 4-3]

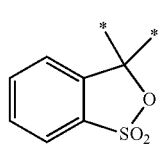

[Chemical Formula 4-4]

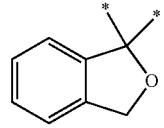

[Chemical Formula 4-5]

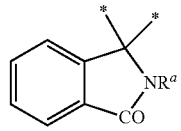

wherein, in Chemical Formula 4-5,
$R^a$ is a hydrogen atom, an ethyl group, $C_2H_4Cl$, $C_2H_4OH$, $CH_2CH{=}CH_2$, or a phenyl group,

[Chemical Formula 4-6]

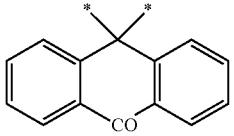

[Chemical Formula 4-7]

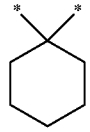

[Chemical Formula 4-8]

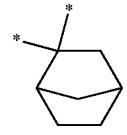

[Chemical Formula 4-9]

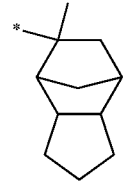

[Chemical Formula 4-10]

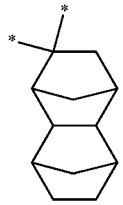

[Chemical Formula 4-11]

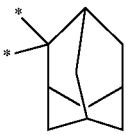

$Z^2$ is an acid anhydride moiety, and
t1 and t2 are independently an integer ranging from 0 to 4.

A weight average molecular weight of the cardo-based binder resin may be 500 g/mol to 50,000 g/mol, for example 1,000 g/mol to 30,000 g/mol. When the weight average molecular weight of the cardo-based binder resin is within the ranges, a satisfactory pattern may be formed without a residue during a production of a cured layer and without losing a film thickness during development of the solvent type curable composition.

The cardo-based binder resin may include a functional group represented by Chemical Formula 5 at at least one terminal end of both terminal ends.

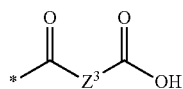

[Chemical Formula 5]

In Chemical Formula 5,
$Z^3$ is represented by Chemical Formula 5-1 to Chemical Formula 5-7.

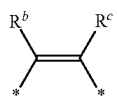

[Chemical Formula 5-1]

In Chemical Formula 5-1, $R^b$ and $R^c$ are independently a hydrogen atom, a substituted or unsubstituted C1 to C20 alkyl group, an ester group, or an ether group.

[Chemical Formula 5-2]

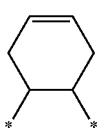

[Chemical Formula 5-3]

[Chemical Formula 5-4]

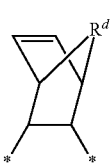

[Chemical Formula 5-5]

In Chemical Formula 5-5, $R^d$ is O, S, NH, a substituted or unsubstituted C1 to C20 alkylene group, a C1 to C20 alkylamine group, or a C2 to C20 alkenylamine group.

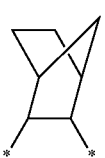

[Chemical Formula 5-6]

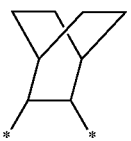

[Chemical Formula 5-7]

The cardo-based resin may be, for example prepared by mixing at least two of a fluorene-containing compound such as 9,9-bis(4-oxiranylmethoxyphenyl)fluorene; an anhydride compound such as benzenetetracarboxylic acid dianhydride, naphthalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, and tetrahydrophthalic anhydride; a glycol compound such as ethylene glycol, propylene glycol, and polyethylene glycol; an alcohol compound such as methanol, ethanol, propanol, n-butanol, cyclohexanol, and benzylalcohol; a solvent-based compound such as propylene glycol methylethylacetate, and N-methylpyrrolidone; a phosphorus compound such as triphenylphosphine; and an amine or ammonium salt compound such as tetramethylammonium chloride, tetraethylammonium bromide, benzyldiethylamine, triethylamine, tributylamine, or benzyltriethylammonium chloride.

When the binder resin is a cardo-based resin, the solvent type curable composition including the same, particularly the photosensitive resin composition has excellent developability and sensitivity during photo-curing and thus, fine pattern-forming capability.

An acid value of the acryl-based resin may be 80 mgKOH/g to 130 mgKOH/g. When the acryl-based resin has an acid value within the ranges, excellent resolution of a pixel may be obtained.

The epoxy resin may be a thermally polymerizable monomer or oligomer, and may include a compound having a carbon-carbon unsaturated bond and a carbon-carbon cyclic bond.

The epoxy resin may further include a bisphenol A epoxy resin, a bisphenol F epoxy resin, a phenol novolac epoxy resin, a cyclic aliphatic epoxy resin, and an aliphatic polyglycidyl ether, but is not necessarily limited thereto.

As commercially available product of the compound, may be a bisphenyl epoxy resin such as YX4000, YX4000H, YL6121H, YL6640, or YL6677 of Yuka Shell Epoxy Co., Ltd.; a cresol novolac epoxy resin such as EOCN-102, EOCN-103S, EOCN-1045, EOCN-1020, EOCN-1025, and EOCN-1027 of Nippon Kayaku Co. Ltd. and EPIKOTE 180S75, and the like of Yuka Shell Epoxy Co., Ltd.; a bisphenol A epoxy resin such as EPIKOTE 1001, 1002, 1003, 1004, 1007, 1009, 1010, and 828 of Yuka Shell Epoxy Co., Ltd.; a bisphenol F epoxy resin such as EPIKOTE 807 and 834 of Yuka Shell Epoxy Co., Ltd.; a phenol novolac epoxy resin such as EPIKOTE 152, 154, or 157H65 of Yuka Shell Epoxy Co. and EPPN 201, 202 of Nippon Kayaku Co. Ltd.; a cyclic aliphatic epoxy resin such as CY175, CY177, and CY179 of CIBA-GEIGY A.G Corp., ERL-4234, ERL-4299, ERL-4221, and ERL-4206 of U.C.C., Showdyne 509 of Showa Denko K.K., Araldite CY-182, CY-184, and CY-192 of CIBA-GEIGY A.G Corp., EPICLON 200 and 400 of Dainippon Ink & Chemicals Inc., EPIKOTE 871 and 872 of Yuka Shell Epoxy Co. and EP1032H60, ED-5661, and ED-5662 of Celanese Coating Corporation; an aliphatic polyglycidylether such as EPIKOTE 190P and 191P of Yuka Shell Epoxy Co., EPOLITE 100MF of Kyoeisha Yushi Kagaku Kogyo Co., Ltd., EPIOL TMP of Nihon Yushi K. K., and the like.

The binder resin may be included in an amount of 1 wt % to 30 wt % based on a total weight of the solvent type curable composition.

Solvent

The solvent may for example include alcohols such as methanol, ethanol, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol monomethylether acetate, propylene glycol propylether acetate, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactate esters such as methyl lactate, ethyl lactate, and the like; hydroxy acetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl ester such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; or ketonate esters such as ethyl pyruvate, and the like, and in addition, may be N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and the like, but is not limited thereto.

For example, the solvent may be desirably glycol ethers such as ethylene glycol monoethylether, ethylene diglycolmethylethylether, and the like; ethylene glycol alkylether acetates such as ethyl cellosolve acetate, and the like; esters such as 2-hydroxy ethyl propionate, and the like; carbitols such as diethylene glycol monomethylether, and the like; propylene glycol alkylether acetates such as propylene glycol monomethylether acetate, propylene glycol propylether acetate, and the like; alcohols such as ethanol, and the like, or a combination thereof.

For example, the solvent may be a polar solvent including propylene glycol monomethylether acetate, dipropylene glycol methylether acetate, ethanol, ethylene glycoldimethylether, ethylenediglycolmethylethylether, diethylene glycoldimethylether, 2-butoxyethanol, N-methylpyrrolidine, N-ethylpyrrolidine, propylene carbonate, γ-butyrolactone, or a combination thereof.

The solvent may be included in a balance amount, for example 30 wt % to 80 wt %, for example 35 wt % to 70 wt % based on a total amount of the solvent type curable composition. When the solvent is within the range, the solvent type curable composition has appropriate viscosity and thus may have excellent coating property when coated in a large area through spin-coating and slit-coating.

For example, the solvent type curable composition may further include at least one of a polymerizable monomer having a carbon-carbon double bond at the terminal end, a polymerization initiator, a light diffusing agent, and other additives and detailed compositions or amounts are the same as described above.

For example, the solvent type curable composition may be a photosensitive resin composition. In this case, the solvent type curable composition may include a photopolymerization initiator as the polymerization initiator.

Another embodiment provides a cured layer produced using the aforementioned solvent-free curable composition and solvent type curable composition, a color filter including the cured layer, and a display device including the color filter.

One of methods of producing the cured layer may include coating the aforementioned solvent-free curable composition and solvent type curable composition on a substrate using an ink-jet spraying method to form a pattern (S1); and curing the pattern (S2).

(S1) Formation of Pattern

The solvent-free curable composition may desirably be coated to be 0.5 µm to 20 µm on a substrate in an ink-jet spraying method. The ink-jet spraying method may form a pattern by spraying a single color per each nozzle and thus repeating the spraying as many times as the needed number of colors, but the pattern may be formed by simultaneously spraying the needed number of colors through each ink-jet nozzle in order to reduce processes.

(S2) Curing

The obtained pattern is cured to obtain a pixel. Herein, the curing method may be thermal curing or photocuring process. The thermal curing process may be performed at greater than or equal to 100° C., desirably, in a range of 100° C. to 300° C., and more desirably, in a range of 160° C. to 250° C. The photocuring process may include irradiating an actinic ray such as a UV ray of 190 nm to 450 nm, for example 200 nm to 500 nm. The irradiating is performed by using a light source such as a mercury lamp with a low pressure, a high pressure, or an ultrahigh pressure, a metal halide lamp, an argon gas laser, and the like. An X ray, an electron beam, and the like may be also used as needed.

The other method of producing the cured layer may include producing a cured layer using the aforementioned solvent-free curable composition or solvent type curable composition by a lithographic method as follows.

(1) Coating and Film Formation

The aforementioned curable resin composition is coated to have a desired thickness, for example, a thickness ranging from 2 µm to 10 µm, on a substrate which undergoes a predetermined pretreatment, using a spin or slit coating method, a roll coating method, a screen-printing method, an applicator method, and the like. Then, the coated substrate is heated at a temperature of 70° C. to 90° C. for 1 minute to 10 minutes to remove a solvent and to form a film.

(2) Exposure

The resultant film is irradiated by an actinic ray such as a UV ray of 190 nm to 450 nm, for example 200 nm to 500 nm after putting a mask with a predetermined shape to form a desired pattern. The irradiating is performed by using a light source such as a mercury lamp with a low pressure, a high pressure, or an ultrahigh pressure, a metal halide lamp, an argon gas laser, and the like. An X ray, an electron beam, and the like may be also used as needed.

Exposure process uses, for example, a light dose of 500 mJ/cm² or less (with a 365 nm sensor) when a high pressure mercury lamp is used. However, the light dose may vary depending on kinds of each component of the curable composition, its combination ratio, and a dry film thickness.

(3) Development

After the exposure process, an alkali aqueous solution is used to develop the exposed film by dissolving and removing an unnecessary part except the exposed part, forming an image pattern. In other words, when the alkali developing solution is used for the development, a non-exposed region is dissolved, and an image color filter pattern is formed.

(4) Post-Treatment

The developed image pattern may be heated again or irradiated by an actinic ray and the like for curing, in order to accomplish excellent quality in terms of heat resistance, light resistance, close contacting properties, crack-resistance, chemical resistance, high strength, storage stability, and the like.

Mode for Invention

Hereinafter, the present invention is illustrated in more detail with reference to examples. These examples, however, are not in any sense to be interpreted as limiting the scope of the invention.

Synthesis of Ligand

Synthesis Example 1

400 g of polyoxyethylene monomethyl ether (MPEG-400, Hannong Chemicals Inc.), 124 g of bicyclo[2.2.2]oct-7-ene-2,3,5,6-tetracarboxylic dianhydride, 500 g of toluene, and 60 g of triethylene amine were put and then, heated up to 100° C. and reacted for 24 hours. When a reaction was complete, the resultant was neutralized with a 5% HCl aqueous solution, and the toluene was removed therefrom to obtain 500 g of a final product represented by Chemical Formula 1-1.

[Chemical Formula 1-1]

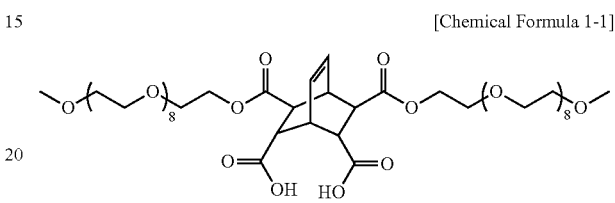

Synthesis Example 2

400 g of a final product represented by Chemical Formula 1-2 was obtained according to the same method as Synthesis Example 1 except that 270 g of polyoxyethylene phenyl ether (PH-4, Hannong Chemicals Inc.) was used instead of 400 g of the polyoxyethylene monomethyl ether.

[Chemical Formula 1-2]

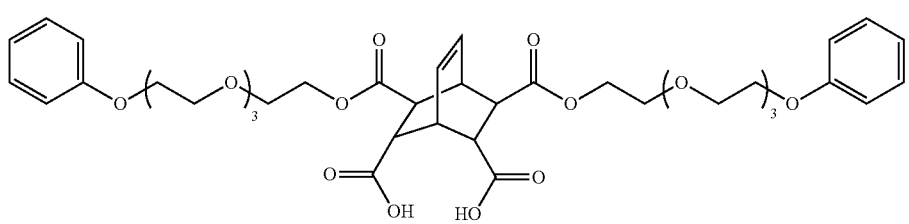

Synthesis Example 3

630 g of a final product represented by Chemical Formula 1-3 was obtained according to the same method as Synthesis Example 1 except that 520 g of polyoxyethylene cumyl phenyl ether (Hannong Chemicals Inc.) was used instead of 400 g of the polyoxyethylene monomethyl ether.

[Chemical Formula 1-3]

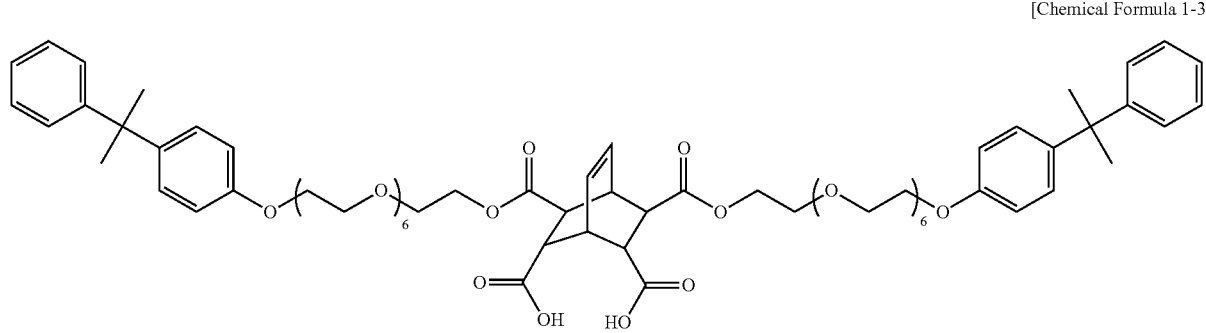

Comparative Synthesis Example 1

10 g of 2-mercapto-1-ethanol, 13.3 g of 2-2-(2-methoxyethoxy)ethoxy acetic acid, and 2.1 g of p-toluene sulfonic acid monohydrate were put in a 2-neck round-bottomed flask and then, dissolved in 300 mL of cyclohexane. A dean stark was fastened into an injection hole, and a condenser was connected thereto. After refluxing the reactant for 8 hours, a reaction was completed. (A final amount of water gathered in the dean stark was measured). The reactants were moved to a separating funnel and then, extracted, neutralized to remove the solvent, and dried in a vacuum oven to obtain a final product represented by Chemical Formula C-1.

[Chemical Formula C-1]

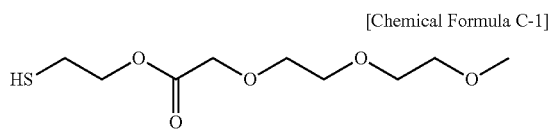

Preparation of Dispersion of Quantum Dots Surface-modified with Ligand

Preparation Example 1

After putting a magnetic bar in a 3-neck round-bottomed flask, a quantum dot-CHA (cyclohexyl acetate) solution (solid content: 26 wt % to 27 wt %) was measured and put therein. The ligand represented by Chemical Formula 1-1 was added thereto.

The resultant was well mixed for 1 minute and then, stirred at 80° C. under a nitrogen atmosphere. When a reaction was complete, the resultant was cooled down to room temperature, and a quantum dot reaction solution was added to cyclohexane to get precipitates. The precipitated quantum dot powders were separated from the cyclohexane through centrifugation. A clear solution was poured out and discarded, and then, the precipitates were sufficiently dried in a vacuum oven for a day to obtain surface-modified quantum dots.

The surface-modified quantum dots were stirred with a monomer represented by Chemical Formula 3-2 (1,6-hexanediol diacrylate, Miwon Commercial Co., Ltd) for 12 hours to obtain surface-modified quantum dot dispersion.

[Chemical Formula 3-2]

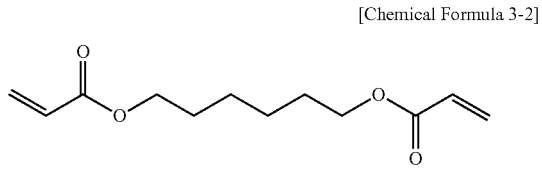 [SMILES: C=CC(=O)OCCCCCCOC(=O)C=C]

Preparation Example 2

Surface-modified quantum dot dispersion was obtained according to the same method as Preparation Example 1 except that the ligand represented by Chemical Formula 1-2 was used instead of the ligand represented by Chemical Formula 1-1.

Preparation Example 3

Surface-modified quantum dot dispersion was obtained according to the same method as Preparation Example 1 except that the ligand represented by Chemical Formula 1-3 was used instead of the ligand represented by Chemical Formula 1-1.

Comparative Preparation Example 1

Surface-modified quantum dot dispersion was obtained according to the same method as Preparation Example 1 except that the ligand represented by Chemical Formula C-1 was used instead of the ligand represented by Chemical Formula 1-1.

Evaluation 1: Dispersibility

A particle size of each quantum dot dispersion according to Preparation Examples 1 to 3 and Comparative Preparation Example 1 was three times measured by using a micro particle size analyzer to obtain an average particle size, and the results are shown in Table 1.

TABLE 1

| Particle size (nm) | Preparation Example 1 | Preparation Example 2 | Preparation Example 3 | Comparative Preparation Example 1 |
|---|---|---|---|---|
| D50 | 11.0 | 11.2 | 11.8 | 15.0 |

From Table 1, each of the quantum dot dispersion according to Preparation Examples 1 to 4 exhibited a narrow particle distribution, which shows that the quantum dots were well dispersed in a high boiling-point and high surface-tension solvent, but the quantum dot dispersion according to Comparative Preparation Example 1 exhibited a wide particle distribution, which shows that the quantum dots were not well dispersed in the high boiling-point and high surface-tension solvent.

Preparation of Solvent-free Curable Composition

Example 1

The dispersion according to Preparation Example 1 was weighed and then, mixed and diluted with the monomer represented by Chemical Formula 3-2, and a polymerization inhibitor (methylhydroquinone, Tokyo Chemical Industry Co., Ltd.) was added thereto and then, stirred for 5 minutes. Subsequently, a photoinitiator (TPO-L; polynetron) was added thereto, and a light-diffusing agent (TiO$_2$ (a solid: 50 wt %); Ditto Technology Co., Ltd.) was added thereto. The entire dispersion was stirred for 1 hour to prepare a solvent-free curable composition. Based on a total amount of the solvent-free curable composition, the quantum dots were included in an amount of 40 wt %, the monomer represented by Chemical Formula 3-2 was included in an amount of 48 wt %, the polymerization inhibitor was included in an amount of 1 wt %, the photoinitiator was included in an amount of 3 wt %, and the light-diffusing agent was included in an amount of 8 wt %.

Example 2

A solvent-free curable composition was prepared according to the same method as Example 1 except that the dispersion according to Preparation Example 2 was used instead of the dispersion according to Preparation Example 1.

Example 3

A solvent-free curable composition was prepared according to the same method as Example 1 except that the dispersion according to Preparation Example 3 was used instead of the dispersion according to Preparation Example 1.

Comparative Example 1

A solvent-free curable composition was prepared according to the same method as Example 1 except that the dispersion according to Comparative Preparation Example 1 was used instead of the dispersion according to Preparation Example 1.

Evaluation 2: Evaluation of Optical Properties

Each solvent-free curable composition according to Example 1 to Example 3 and Comparative Example 1 was coated to be 15 μm thick on yellow photoresists (YPR) with a spin coater (800 rpm, 5 seconds, Opticoat MS-A150, Mikasa Co., Ltd.) and exposed with 5000 mJ (83° C., 10 seconds) with a 395 nm UV exposer under a nitrogen atmosphere. Subsequently, each 2 cm×2 cm single film specimen was loaded in an integrating sphere equipment (QE-2100, Otsuka Electronics, Co., Ltd.) to measure a light conversion rate. Then, the loaded single film specimens were dried at 180° C. in a drying furnace under a nitrogen atmosphere for 30 minutes, and then, light retention rates of the specimens after the exposure until the drying were measured, and the results are shown in Table 2.

TABLE 2

| | Light conversion rate (%) | Light retention rate (%) | Maximum emission wavelength (nm) |
|---|---|---|---|
| Example 1 | 27.3 | 92 | 542 |
| Example 2 | 28.1 | 93 | 542 |
| Example 3 | 26.2 | 91 | 542 |
| Comparative Example 1 | 22.8 | 91 | 543 |

From Table 2, the solvent-free curable composition according to an embodiment exhibited improved optical properties.

Preparation of Solvent Type Curable Composition

Example 4

The following components were used in corresponding amounts to prepare a solvent type curable composition (photosensitive resin composition).

Specifically, the photopolymerization initiator was dissolved in the solvent and then, sufficiently stirred at room temperature for 2 hours. Subsequently, the binder resin along with the quantum dot dispersion of Preparation Example 1, the dispersing agent (TEGO D685, Evonik Corp.), and the polymerizable monomer was added thereto and then, stirred again at room temperature for 2 hours. Then, the light diffusing agent and the fluorine-based surfactant were added thereto and then, stirred for 1 hour at room temperature, and the above product was three times filtered to remove impurities and thus prepare a photosensitive resin composition.

1) Quantum dot dispersion: Preparation Example 1
2) Binder resin: 25 wt % of cardo-based binder resin (TSR-TA01, TAKOMA)
3) Polymerizable monomer: 5.4 wt % of pentaerythritol-hexamethacrylate (DPHA, Nippon Kayaku)
4) Photopolymerization initiator: 0.7 wt % of diphenyl(2,4,6-trimethylbenzoyl)phosphine oxide (TPO, Sigma-Aldrich Corporation)
5) Solvent: 39 wt % of dimethyl adipate
6) Light diffusing agent: 15 wt % of titanium dioxide dispersion (a $TiO_2$ solid content: 20 wt %, an average particle diameter: 200 nm, Ditto Technology)
7) Other additives: 0.9 wt % of fluorine-based surfactant (F-554, DIC Co., Ltd.)

Example 5

A photosensitive resin composition was obtained according to the same method as Example 4 except that the quantum dot dispersion of Preparation Example 2 was used instead of the quantum dot dispersion of Preparation Example 1.

Example 6

A photosensitive resin composition was obtained according to the same method as Example 4 except that the quantum dot dispersion of Preparation Example 3 was used instead of the quantum dot dispersion of Preparation Example 1.

Comparative Example 2

A photosensitive resin composition was obtained according to the same method as Example 4 except that the quantum dot dispersion of Comparative Preparation Example 1 was used instead of the quantum dot dispersion of Preparation Example 1.

Evaluation 3: Light Conversion Rate and Light Retention Rate of Quantum Dots

The curable compositions according to Example 4 to Example 6 and Comparative Example 2 were respectively coated to be 6 μm thick on a single-surface of a glass substrate with a spin coater (150 rpm, Opticoat MS-A150, Mikasa Co., Ltd.) and then, dried on a hot-plate at 80° C. for 1 minute to obtain films. Then, a light conversion rate was measured with an exposer (ghi broadband, Ushio Inc.) by performing post-baking (POB) in a convection clean oven (Jongro) at 180° C. for 30 minutes after irradiating UV with power of 100 $mJ/cm^2$, and the results are shown in Table 3.

TABLE 3

| | (unit: %) | | | |
|---|---|---|---|---|
| | Example 4 | Example 5 | Example 6 | Comparative Example 2 |
| Initial light conversion rate | 24.6 | 26.0 | 23.9 | 22.0 |
| Light conversion rate after performing POB once | 24.3 | 25.2 | 23.1 | 20.0 |

As shown in Table 3, the solvent type curable composition prepared by using the surface-modified quantum dots according to an embodiment exhibited small deterioration of a light conversion rate due to a color filter process but a high light retention rate.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

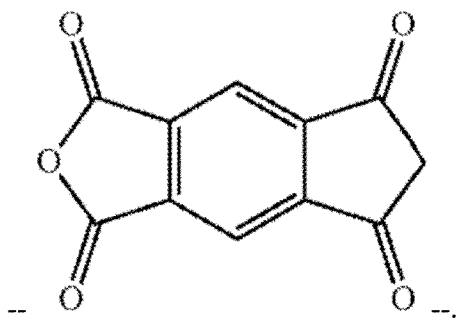

The invention claimed is:

1. A quantum dot surface-modified with a compound represented by Chemical Formula 1:

Chemical Formula 1

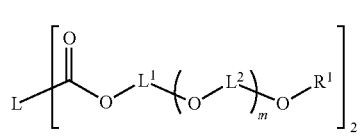

wherein, in Chemical Formula 1,

L is a divalent moiety derived from acid dianhydride, $L^1$ and $L^2$ are independently a substituted or unsubstituted C1 to C20 alkylene group, $R^1$ is a substituted or unsubstituted C1 to C20 alkyl group or a substituted or unsubstituted C6 to C20 aryl group, and m is an integer of 1 to 20.

2. The quantum dot of claim 1, wherein the L is a divalent moiety derived from a compound represented by one of Chemical Formula 2-1 to Chemical Formula 2-15:

Chemical Formula 2-1

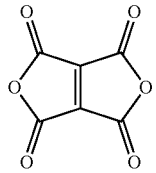

Chemical Formula 2-2

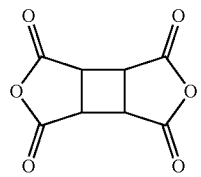

Chemical Formula 2-3

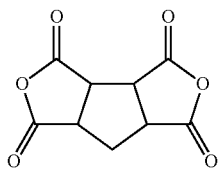

Chemical Formula 2-4

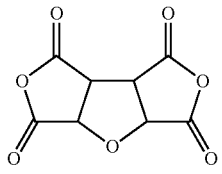

-continued

Chemical Formula 2-5

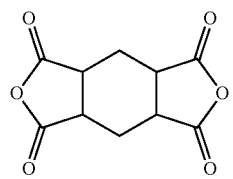

Chemical Formula 2-6

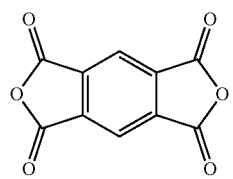

Chemical Formula 2-7

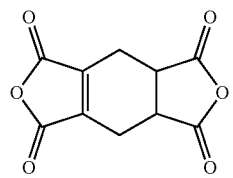

Chemical Formula 2-8

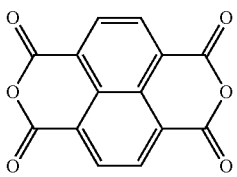

Chemical Formula 2-9

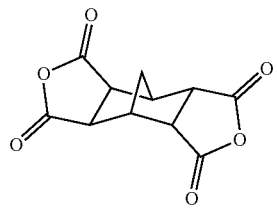

Chemical Formula 2-10

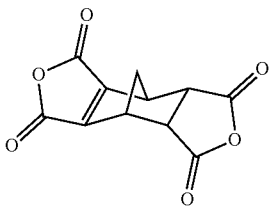

Chemical Formula 2-11

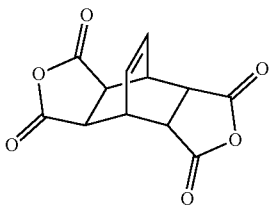

Chemical Formula 2-12
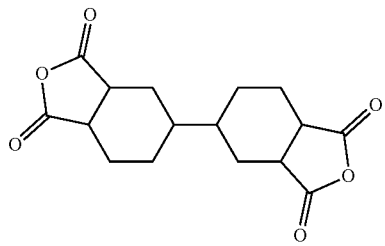
Chemical Formula 2-13
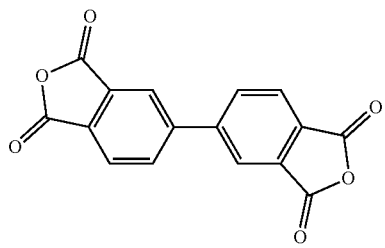
Chemical Formula 2-14
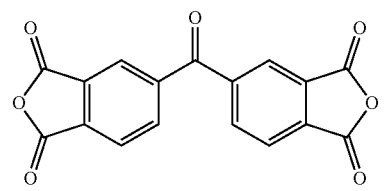
Chemical Formula 2-15
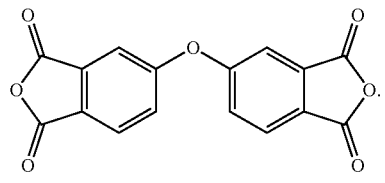
3. The quantum dot of claim 1, wherein the L is represented by one selected from the following:
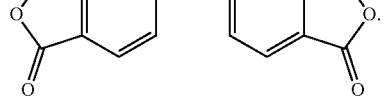
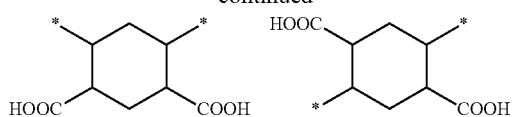
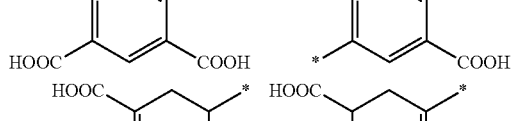
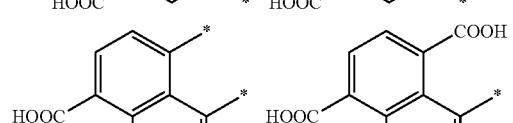
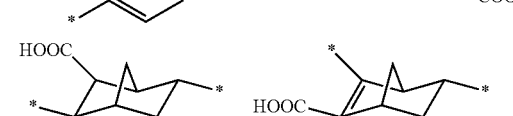
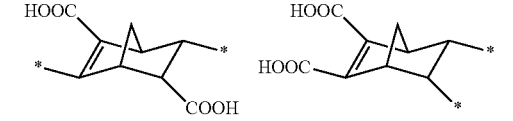
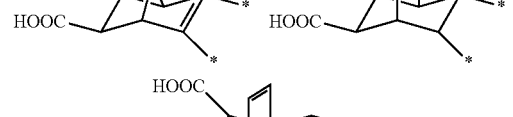
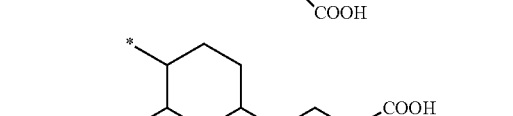
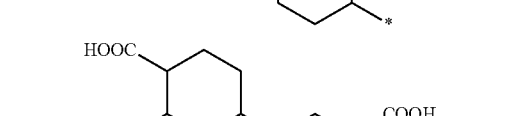
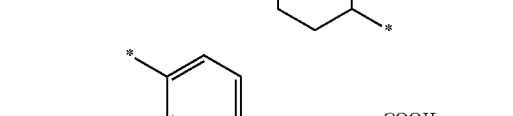
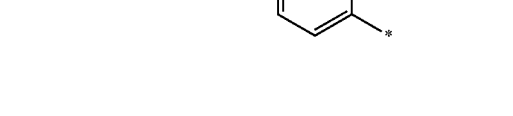

-continued

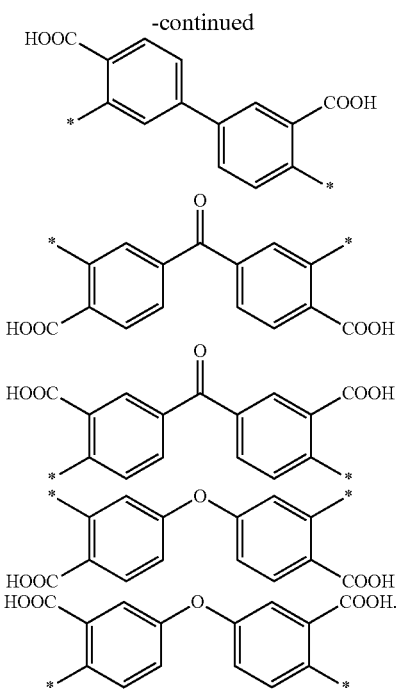

4. The quantum dot of claim 1, wherein Chemical Formula 1 is represented by one of Chemical Formula 1-1 to Chemical Formula 1-3:

and
  wherein, in Chemical Formula 1-1 to Chemical Formula 1-3,
  n is an integer of 1 to 20.

5. The quantum dot of claim 1, wherein the quantum dot has a maximum fluorescence emission wavelength from 500 nm to 680 nm.

6. A solvent-free curable composition comprising
  the quantum dot of claim 1; and
  a polymerizable monomer having a carbon-carbon double bond at the terminal end.

7. The solvent-free curable composition of claim 6, wherein the polymerizable monomer has a molecular weight of 220 to 1,000 g/mol.

8. The solvent-free curable composition of claim 6, wherein the polymerizable monomer is represented by Chemical Formula 3:

Chemical Formula 3

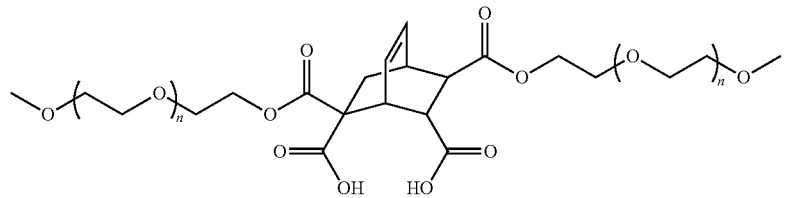

and
  wherein, in Chemical Formula 3,
  $R^2$ and $R^3$ are independently a hydrogen atom or a substituted or unsubstituted C1 to C10 alkyl group, Chemical Formula 1-1

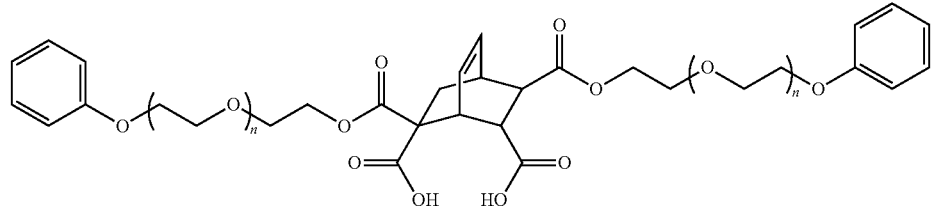

Chemical Formula 1-2

Chemical Formula 1-3

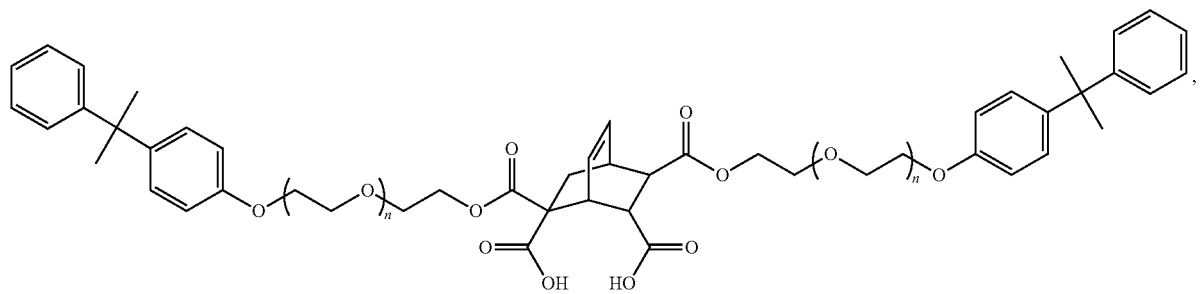

L⁷ and L⁹ are independently a substituted or unsubstituted C1 to C10 alkylene group, and L⁸ is a substituted or unsubstituted C1 to C10 alkylene group, or an ether group (*—O—*).

9. The solvent-free curable composition of claim 6, comprising
1 wt % to 60 wt % of the quantum dot, and
40 wt % to 99 wt % of the polymerizable monomer.

10. The solvent-free curable composition of claim 6, further comprising a polymerization initiator, a light diffusing agent, or a combination thereof.

11. A solvent-type curable composition comprising
the quantum dot of claim 1;
a binder resin; and
a solvent.

12. The solvent-type curable composition of claim 11, comprising
1 wt % to 40 wt % of the quantum dot;
1 wt % to 30 wt % of the binder resin; and
a balance amount of the solvent.

13. The solvent-type curable composition of claim 11, further comprising a polymerizable monomer, a polymerization initiator, a light diffusing agent, or a combination thereof.

14. A cured layer produced from the solvent-free curable composition of claim 6.

15. A color filter comprising the cured layer of claim 14.

* * * * *

UNITED STATES PATENT AND TRADEMARK OFFICE
CERTIFICATE OF CORRECTION

PATENT NO. : 12,351,750 B2  
APPLICATION NO. : 17/595497  
DATED : July 8, 2025  
INVENTOR(S) : Yonghee Kang et al.

Page 1 of 2

It is certified that error appears in the above-identified patent and that said Letters Patent is hereby corrected as shown below:

In the Claims

In Column 36, Lines 2-9, in Claim 2, delete " 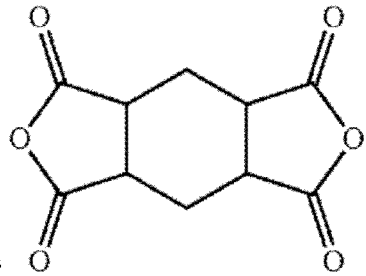 " and insert 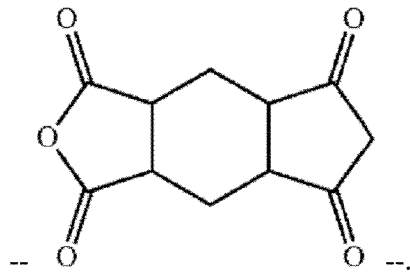 --.

In Column 36, Lines 11-19, in Claim 2, delete " 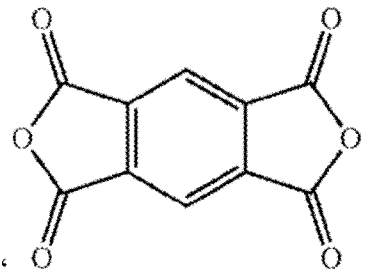 " and insert

Signed and Sealed this  
Twenty-first Day of October, 2025

John A. Squires  
*Director of the United States Patent and Trademark Office*

CERTIFICATE OF CORRECTION (continued)
U.S. Pat. No. 12,351,750 B2